US011836762B2

(12) United States Patent
Buchalter et al.

(10) Patent No.: US 11,836,762 B2
(45) Date of Patent: *Dec. 5, 2023

(54) SYSTEMS, METHODS AND PROGRAMMED PRODUCTS FOR TRACKING DELIVERY AND PERFORMANCE OF STATIC ADVERTISEMENTS IN PUBLIC OR SEMI-PUBLIC LOCATIONS WITHIN A DIGITAL ADVERTISING PLATFORM

(71) Applicant: Place Exchange, Inc., New York, NY (US)

(72) Inventors: Yehuda Ari Buchalter, Forest Hills, NY (US); Jason Shao, Pocono Pines, PA (US); William T. Maslyn, Poughkeepsie, NY (US)

(73) Assignee: PLACE EXCHANGE, INC., New York, NY (US)

( * ) Notice: Subject to any disclaimer, the term of this patent is extended or adjusted under 35 U.S.C. 154(b) by 206 days.

This patent is subject to a terminal disclaimer.

(21) Appl. No.: 17/363,747

(22) Filed: Jun. 30, 2021

(65) Prior Publication Data

US 2021/0326935 A1 Oct. 21, 2021

Related U.S. Application Data

(63) Continuation of application No. 16/780,408, filed on Feb. 3, 2020, now Pat. No. 11,080,761.

(Continued)

(51) Int. Cl.
*G06Q 30/02* (2023.01)
*G06Q 30/0273* (2023.01)
(Continued)

(52) U.S. Cl.
CPC ..... *G06Q 30/0273* (2013.01); *G06Q 30/0246* (2013.01); *G06Q 30/0247* (2013.01);
(Continued)

(58) Field of Classification Search
CPC .............. G06Q 30/02; G06Q 30/0273; G06Q 30/0246; G06Q 30/0247; G06Q 30/0249;
(Continued)

(56) References Cited

U.S. PATENT DOCUMENTS 9,239,868 B2  1/2016  Neerincx et al.
9,373,123 B2  6/2016  Carlson et al.
(Continued)

FOREIGN PATENT DOCUMENTS

WO    2002029665 A1    4/2002
WO    2009/099875 A3   8/2009
WO    WO 2016/160303 A1 * 10/2016  ............... G06F 3/12

OTHER PUBLICATIONS

Elrod, James K.; Fortenberry, John L. Jr., Billboard advertising: an avenue for communicating healthcare information and opportunities to disadvantage populations (English), BMC Health Services Research, 17 (Suppl 4), 787, Dec. 13, 2017 (Year: 2017).*

(Continued)

*Primary Examiner* — Marilyn G Macasiano
(74) *Attorney, Agent, or Firm* — Amster Rothstein & Ebenstein LLP

(57) ABSTRACT

A system and method for dynamically tracking the delivery and performance of static advertising placed in public or semi-public physical locations, and integrating, displaying, and reporting impressions and events related to the static advertising in digital ad buying systems.

53 Claims, 14 Drawing Sheets

Related U.S. Application Data

(60) Provisional application No. 62/866,169, filed on Jun. 25, 2019.

(51) Int. Cl.
*G06Q 30/0242* (2023.01)
*G06Q 30/0241* (2023.01)
*G06Q 30/0272* (2023.01)

(52) U.S. Cl.
CPC ..... *G06Q 30/0249* (2013.01); *G06Q 30/0272* (2013.01); *G06Q 30/0276* (2013.01)

(58) Field of Classification Search
CPC ........... G06Q 30/0272; G06Q 30/0276; G06Q 30/0254; G06Q 10/067; G06Q 30/0207
See application file for complete search history.

(56) References Cited

U.S. PATENT DOCUMENTS

| | | | |
|---|---|---|---|
| 9,706,515 | B1 | 7/2017 | Chadwick |
| 10,552,871 | B1 | 2/2020 | Chadwick |
| 2004/0117257 | A1 | 6/2004 | Haberman et al. |
| 2005/0044254 | A1 | 2/2005 | Smith |
| 2009/0097705 | A1* | 4/2009 | Thorn .................... G06Q 40/00 382/103 |
| 2009/0146775 | A1* | 6/2009 | Bonnaud ................ G06F 9/453 340/3.1 |
| 2009/0197616 | A1* | 8/2009 | Lewis ................ H04M 3/4878 455/456.1 |
| 2010/0226535 | A1* | 9/2010 | Kimchi ................... G06F 3/013 382/103 |
| 2013/0346550 | A1 | 12/2013 | Higgins |
| 2016/0044358 | A1 | 2/2016 | Zucchetta |
| 2016/0125466 | A1 | 5/2016 | Kulkarni et al. |
| 2018/0173488 | A1 | 6/2018 | Zenoff |
| 2019/0043080 | A1 | 2/2019 | Buchalter et al. |

OTHER PUBLICATIONS

U.S. Appl. No. 16/054,516, filed Aug. 3, 2018, Issued as U.S. Pat. No. 10,740,786.
U.S. Appl. No. 16/780,408, filed Feb. 3, 2020, Issued as U.S. Pat. No. 11,080,761.
U.S. Appl. No. 16/670,484, filed Oct. 31, 2019, Granted—Patent to issue on Oct. 5, 2021.
U.S. Appl. No. 16/820,091, filed Mar. 16, 2020, Issued as U.S. Pat. No. 10,776,832.
U.S. Appl. No. 16/855,043, filed Apr. 22, 2020, Issued as U.S. Pat. No. 11,074,608.
U.S. Appl. No. 16/943,738, filed Jul. 30, 2020, Notice of Allowance dated Sep. 23, 2021.
U.S. Appl. No. 17/226,790, filed Apr. 9, 2021, Pending.
U.S. Appl. No. 17/363,747, filed Jun. 30, 2021, Present Application.
PCT International Search Report and Written Opinion dated Jan. 13, 2020 in connection with PCT International Patent Application No. PCT/US2019/059161.
PCT International Search Report and Written Opinion dated May 5, 2020 in connection with PCT International Patent Application No. PCT/US2020/16399.
Aleksandr Belov; Yaroslav Abramov, Approach for Increasing the Adaptability of Digital Outdoor Advertsing (Englich), 2020 IEEE International IOT, Electronics and Mechatronics Conference (IEMTRONICS) (pp. 1-5), Sep. 1, 2020 (Year: 2020).

* cited by examiner

SYSTEMS, METHODS AND PROGRAMMED PRODUCTS FOR TRACKING DELIVERY AND PERFORMANCE OF STATIC ADVERTISEMENTS IN PUBLIC OR SEMI-PUBLIC LOCATIONS WITHIN A DIGITAL ADVERTISING PLATFORM

RELATED APPLICATIONS

This application claims priority to and the benefit of U.S. application Ser. No. 16/780,408, filed Feb. 3, 2020 and entitled SYSTEMS, METHODS AND PROGRAMMED PRODUCTS FOR TRACKING DELIVERY AND PERFORMANCE OF STATIC ADVERTISEMENTS IN PUBLIC OR SEMI-PUBLIC LOCATIONS WITHIN A DIGITAL ADVERTISING PLATFORM, which claims priority to and the benefit of U.S. Provisional Application No. 62/866,169, filed Jun. 25, 2019 and entitled SYSTEMS, METHODS AND PROGRAMMED PRODUCTS FOR TRACKING DELIVERY AND PERFORMANCE OF NON-DIGITAL ADVERTISEMENTS IN PUBLIC OR SEMI-PUBLIC LOCATIONS WITHIN A DIGITAL ADVERTISING PLATFORM, the contents of all of which are incorporated herein by reference in their entirety.

FIELD

The present invention generally relates to systems and methods for dynamically tracking the delivery and performance of static advertising placed in public or semi-public physical locations, and integrating, displaying, and reporting impressions and events related to the static advertising in digital ad buying systems.

BACKGROUND

A significant and robust market exists for buying and selling digital advertisements on various types of personal computing devices, like computers (desktop and laptop), mobile phones and tablets, and other devices operated by a consumer who is the user of the device. Conventional digital advertising buying and tracking systems and methods which were built for personal electronic devices rely on device identification systems and methods to create a record in a digital ad buying system (such as an ad server or demand-side platform) representing the action of showing a digital advertisement ("ad") to a consumer (the "impression") on a particular device, and also a record of the actions that a consumer, who was exposed to the impression, may subsequently take (the "event") that relate to the impression (e.g., visiting a website, making an online purchase, calling a telephone number in response to the advertisement, to name a few). In many cases, the impression and event occur on the same personal electronic device, with a unique device-specific identifier such as a browser cookie or device ID serving as the basis for linking the impression and event on that device. In other cases, the impression and event occur on different personal electronic devices that are used by the same consumer (or an associated consumer, like a family member) and are linked by a common identifying signal across devices (e.g., a hashed login ID used on both devices or a common household ID) that unifies the device-specific identifiers. Thus, conventional tracking systems allow buying parties using digital ad buying systems to automatically track digital impressions delivered on personal electronic devices (to measure campaign delivery) and link impressions to events occurring on personal electronic devices (to measure campaign performance), for a particular advertisement and campaign. However, conventional ad buying and tracking systems are not adapted to be used with static advertisements.

Static advertisements are often placed in public or semi-public locations. Such static advertisements may be displayed on non-digital displays, and may include, for example: printed posters, billboards, bulletins, signage, murals, wrapping of structures or vehicles, sculptures or other three-dimensional structures, and window decals, to name a few, placed at public or semi-public locations such as, for example, on street furniture, phone booths, benches, bus shelters, newsracks, kiosks, within or on public transportation vehicles (e.g., buses, trains, taxis, etc.), at sporting or other event venues, retail locations, airports, transit systems, and commercial or residential buildings, to name a few. The defining characteristic of personal electronic devices is that they are used by only one individual (or by only one account, e.g., a household computer account) who regularly use the device, and therefore digital advertisements shown on these devices are typically seen only by the individual or account in question. By contrast, static advertisements in public or semi-public locations are generally seen by many different people, who have no unique or persistent association with the display on which the static advertisement appears. In addition, with personal electronic devices, the events that occur in response to an impression usually occur on the same personal electronic device as the impression, or on another device that can be associated to the same consumer. By further contrast, events occurring subsequent to static advertisements in public or semi-public locations cannot be directly tied by current ad buying systems to the consumer's viewing of the static advertisement. For these reasons, conventional identification and tracking systems and methods to link impressions and events that occur in association with a static advertisement do not work.

These technical differences create technological barriers to using the same integrated methods and systems used in the conventional art to track impressions and events (e.g., so-called ad serving systems, demand-side platforms, etc.) for digital advertisements on personal electronic devices, from being used to track impressions and events that occur in relation to viewing of static advertisements on static displays.

What is needed is a system and method by which buyers of static advertising can place static advertisements at public or semi-public locations and track delivery and performance of the static advertisements using digital ad buying systems.

SUMMARY

The present invention addresses this and other problems with new and improved systems and methods for dynamically tracking the delivery and performance of static advertisements placed in physical locations in public or semi-public space and for tracking and reporting impressions and events in digital ad buying systems associated with consumers that had the opportunity to view static advertisements.

A method according to an exemplary embodiment of the present invention comprises: storing, on non-volatile computer readable memory of a computer system, first data associated with the following information related to one or more static displays: corresponding identifiers of the one or more static displays; and at least one attribute of each of the one or more static displays; receiving, at the computer system from a first seller of static advertising inventory, a first order for display of a static advertisement for a first period of time at a first static display of the one or more static displays, the first order comprising: the identifier of the first static display of the one or more static displays on which the static advertisement is to be displayed; an identification of the first period of time during which the static advertisement will be displayed on the first static display; a buyer price that a buyer will pay for the first order; an indication of whether or not a call-to-action is embedded within the static advertisement; and upon a condition a call-to-action is embedded within the static advertisement, attributes associated with the call-to-action; associating, by the computer system, the first order with a unique deal identifier ("Deal ID") instantiated in a digital ad buying system by the buyer and corresponding to an agreement between the buyer and the first seller for purchase of the first order; receiving, by the computer system from the digital ad buying system, at least one creative identifier for the static advertisement to be displayed; estimating, by the computer system, a number, X, of advertising impressions related to the static advertisement displayed on the first static display during the first period of time; generating, by the computer system, X unique placeholder advertising identifiers corresponding to the X estimated advertising impressions; collecting, by the computer system, observation data associated with one or more observed personal electronic devices, the observation data comprising for each of the one or more observed personal electronic devices: a device-specific advertising identifier; location data associated with the observed personal electronic device; and an observation timestamp indicating a time an observation occurred; determining, by the computer system, based on the observation data, a number, Y, of observed personal electronic devices located in a viewing geometry relative to the first static display from which users of the observed personal electronic devices had the opportunity to view the static advertisement during the first time period; creating, by the computer system, a corresponding impression record for each impression of the X estimated advertising impressions, the impression record for each impression comprising a unique impression identifier; for each impression record, appending, by the computer system, information comprising: the unique impression identifier; an impression timestamp indicating the time the impression occurred; an advertising identifier including one of the following: the device-specific advertising identifier associated with a corresponding one of the one or more observed personal electronic devices; or one of the X unique placeholder advertising identifiers; the Deal ID; an impression price of each impression; and the at least one creative identifier associated with the static advertising creative; sending, by the computer system to the digital ad buying system or an integrated measurement platform, the following: the X impression records corresponding to the X estimated advertising impressions; and the appended information to the X impression records, corresponding to the X estimated advertising impressions.

In accordance with an exemplary embodiment, the at least one attribute of the at least one static display comprises at least one of the following: a seller name; a seller ID; a name of a seller network with which the at least one static display is associated, wherein the seller network is a grouping of one or more static advertising displays; an ID of a seller network with which the at least one static display is associated, wherein the seller network is a grouping of one or more static advertising displays; a display name; a display ID; a precise location; physical dimensions; directional orientation; lighting characteristics; movement characteristics; a projected number of viewers; prohibited content; zoning restrictions; lead-time required for posting; transit route; or transit schedule.

In accordance with an exemplary embodiment, the buyer price is specified by at least one of the following: a cost per thousand impressions (CPM); a cost per thousand impressions delivered to a particular target audience, based on a set of predetermined audience characteristics; a fixed total amount for a duration of an advertising campaign; a rate of price per unit time; a cost per "click" (CPC) where a click is represented by executing the call-to-action associated with the static advertisement; a cost per "action" (CPA) where an action is represented by a desired action taken by a consumer, following exposure to the static advertisement; a "dynamic CPM" (DCPM) where the cost per thousand impressions is adjusted based on performance of the static advertisement; or a cost per thousand impressions delivered in accordance with a set of target circumstances, wherein the set of target circumstances comprises at least one of time of day, weather conditions or proximity to specific events where the price may be dynamically calculated based on matching specified criteria.

In accordance with an exemplary embodiment, the buyer price is specified by either a fixed total amount or a rate of price per unit time, and the method further comprises calculating, by the computer system, an equivalent CPM price based on the specified buyer price and the estimated impressions per unit time, and appending, by the computer system, the equivalent CPM price as the impression price for each impression record.

In accordance with an exemplary embodiment, the static advertisement is associated with an advertising campaign, and wherein the first order further comprises at least one of the following: a total monetary budget associated with the advertising campaign; a total impression budget associated with the advertising campaign; a time interval for calculating monetary pacing associated with an advertising campaign; a target monetary pacing level associated with the advertising campaign; a time interval for calculating impression pacing associated with the advertising campaign; or a target impression pacing level associated with the advertising campaign.

In accordance with an exemplary embodiment, the method further comprises the step of determining, by the computer system, actual pacing for the advertising campaign based on at least one of the following: spend delivered within the time interval for calculating monetary pacing; or impressions delivered within the time interval for calculating impression pacing.

In accordance with an exemplary embodiment, the first order further comprises an approval indication which indicates whether the first seller has approved the static advertising creative to be displayed.

In accordance with an exemplary embodiment, the Deal ID is associated with a guaranteed deal between the buyer and the first seller.

In accordance with an exemplary embodiment, the step of receiving, by the computer system from the digital ad buying system, at least one creative identifier for the static advertisement to be displayed further comprises receiving, by the computer system from the digital ad buying system, at least one ad tag.

In accordance with an exemplary embodiment, the at least one ad tag is configured to capture information related to a delivery of the static advertisement.

In accordance with an exemplary embodiment, the at least one ad tag comprises at least one of: an impression tracking tag from the ad buying system; a third-party impression tracking tag; measurement code from the ad buying system, configured for measurement of characteristics associated with delivery of the static advertisement; or measurement code from a third party system, configured for measurement of characteristics associated with delivery of the static advertisement.

In accordance with an exemplary embodiment, the method further comprises the step of triggering, by the computer system, the at least one ad tag so as to transmit data related to the delivery of the static advertisement to the ad buying system or a third-party system.

In accordance with an exemplary embodiment, the step of receiving, by the computer system from the digital ad buying system, at least one creative identifier for the static advertisement to be displayed further comprises receiving, by the computer system from the digital ad buying system, at least one click tracking tag.

In accordance with an exemplary embodiment, the at least one click tracking tag is configured to record events initiated on the one or more observed personal electronic devices associated with at least one consumer in direct response to an embedded call-to-action embedded in the static advertising creative.

In accordance with an exemplary embodiment, the method further comprises the steps of: dynamically identifying, by the computer system, at least one action performed on at least one of the one or more observed electronic devices in direct response to a call to action associated with the static advertising creative displayed on the first static display, wherein the step of dynamically identifying the at least one action comprises: receiving, at the computer system from the at least one observed personal electronic device, a first indication that a direct response to the call-to-action was performed; retrieving, by the computer system, at least one of: an associated impression identifier; the Deal ID; or the at least one creative identifier by comparing the creative identifier with attributes of the call-to-action response; performing, by the computer system, a virtual consumer action corresponding to the direct response to the call-to-action as performed on the at least one observed personal electronic device; appending, by the computer system to the virtual consumer action, the device-specific advertising identifier associated with the at least one observed personal electronic device, and at least one of: the associated impression identifier; the Deal ID; or the at least one creative identifier; triggering the at least one click tracking tag with the appended information of step (L)(iv) to register the virtual consumer action in the digital ad buying system or an integrated measurement platform.

In accordance with an exemplary embodiment, the call-to-action comprises at least one of: transmitting a message, the message comprising at least one of an SMS message, MMS message, or messaging system message; visiting a pre-defined webpage URL; scanning of a QR code and execution of an associated embedded action associated with the QR code; sending an e-mail to a pre-defined e-mail address; executing a command within an associated computer or mobile application; redeeming a coupon; redeeming a promotion code; placing a call to a unique call-tracking telephone number; or posting a social media message, the social media message including a unique hashtag.

In accordance with an exemplary embodiment, attributes of the call-to-action comprise at least one of: a unique identifier; a URL; or a keyword associated with the call-to-action.

In accordance with an exemplary embodiment, X is determined based on at least one of the following: rating agency data obtained from rating agencies; network connection data obtained from network connections; sensor data collected from one or more sensors; the observation data; or mobile application data obtained from one or more mobile applications.

In accordance with an exemplary embodiment, the step of estimating, by the computer system, a number, X, of advertising impressions related to the static advertisement displayed on the first static display during the first period of time is performed in real-time.

In accordance with an exemplary embodiment, the step of estimating, by the computer system, a number, X, of advertising impressions related to the static advertisement displayed on the first static display during the first period of time is performed as advertising impression information becomes available.

In accordance with an exemplary embodiment, the step of estimating, by the computer system, a number, X, of advertising impressions related to the static advertisement displayed on the first static display during the first period of time is performed at a regular interval.

In accordance with an exemplary embodiment, the regular interval is at least one of the following: an hour; a plurality of hours; a day; a plurality of days; a week; a plurality of weeks; or an entire duration of an advertising campaign.

In accordance with an exemplary embodiment, the step of estimating, by the computer system, a number, X, of advertising impressions related to the static advertisement displayed on the first static display during the first period of time comprises calculating, by the computer system, the number, X, based on a combination of data from a plurality of estimation data sources.

In accordance with an exemplary embodiment, the step of estimating, by the computer system, a number, X, of advertising impressions related to the static advertisement displayed on the first static display during the first period of time further comprises adjusting, by the computer system, the estimated number, X, of advertising impressions related to the static advertisement based on at least one of the following: a time of a day; a day of a week; a seasonality data skew; an observational data skew; real-time network activity; or real-time sensor data.

In accordance with an exemplary embodiment, the observation data is collected from a plurality of observation data sources via an application programming interface.

In accordance with an exemplary embodiment, the step of collecting, by the computer system, observation data associated with one or more observed personal electronic devices, is performed in real-time.

In accordance with an exemplary embodiment, the step of collecting, by the computer system, observation data associated with one or more observed personal electronic devices, is performed as observation data information becomes available.

In accordance with an exemplary embodiment, the step of collecting, by the computer system, observation data associated with one or more observed personal electronic devices, is performed at a regular interval.

In accordance with an exemplary embodiment, the regular interval is at least one of the following: an hour; a plurality of hours; a day; a plurality of days; a week; a plurality of weeks; or an entire duration of an advertising campaign.

In accordance with an exemplary embodiment, the location data comprises at least one of the following: compass data including latitude data and longitude data; Geohash data; real-time network usage data associated with a specified location; sensor data obtained from one or more sensors associated with a specified location; personal electronic device location data comprising at least one of the following: mobile- or computer-application-derived location data; or purchased third-party location data.

In accordance with an exemplary embodiment, the step of collecting, by the computer system, observation data associated with one or more observed personal electronic devices, further comprises normalizing, by the computer system, the observation data, wherein the step of normalizing comprises the steps of: translating, by the computer system, the observation data into a standardized format; and validating, by the computer system, the observation data by identifying and discounting invalid data, the invalid data being identified by determining the observation data is at least one of the following: provided in an invalid format; provided after a published expiration window; provided with insufficient fidelity as measured against one or more trusted sources; provided with insufficient accuracy as measured against the one or more trusted sources; provided from a lower-resolution data-source; provided with irregularities in distribution; or duplicative with other observation information of the observation data.

In accordance with an exemplary embodiment, the method further comprises the steps of: identifying, by the computer system, restricted observation data of the collected observation data associated with at least one of the one or more observed personal electronic devices on which personal electronic device restrictions are enabled to limit or prevent distribution of at least one of: device-specific advertising identifiers; or location information; and discarding, by the computer system, the restricted observation data.

In accordance with an exemplary embodiment, the step of appending, by the computer system, information further comprises comparing, by the computer system, the X estimated advertising impressions during the first time period to the number, Y, of observed personal electronic devices located within the viewing geometry of the first static display during the first time period.

In accordance with an exemplary embodiment, the step of comparing further comprises: determining, by the computer system, that X is greater than Y; calculating, by the computer system, a third number, Z, wherein Z is equal to X minus Y; obtaining, by the computer system, Y impression records of the X impression records; appending, by the computer system, a unique corresponding one of the device-specific advertising identifiers associated with the Y observed personal electronic devices to each of the Y impression records; and appending, by the computer system, a unique corresponding one of Z randomly selected unique placeholder advertising identifiers of the X unique placeholder advertising identifiers to each remaining impression record of the X impression records.

In accordance with an exemplary embodiment, the step of comparing further comprises: determining, by the computer system, that X is equal to Y; obtaining, by the computer system, the X impression records; and appending, by the computer system, a unique corresponding one of the device-specific advertising identifiers associated with the Y observed personal electronic devices to each of the X impression records.

In accordance with an exemplary embodiment, the step of comparing further comprises: determining, by the computer system, that X is less than Y; selecting, by the computer system, a subset of the Y device-specific advertising identifiers corresponding to the Y observed personal electronic devices, the subset containing X of the Y device-specific advertising identifiers; and appending, by the computer system, a unique corresponding one of the selected sub-set of X device-specific advertising identifiers to each of the X impression records.

In accordance with an exemplary embodiment, the subset X of the Y device-specific advertising identifiers corresponding to the Y observed personal electronic devices, are selected by the computer system either: randomly; or based on a specified criteria.

In accordance with an exemplary embodiment, the specified criteria is based on at least one of the following: a frequency with which the device-specific advertising identifiers are observed over a time interval; predicted performance or response rates of the device-specific advertising identifiers; or audience characteristics matched to the device-specific advertising identifiers.

In accordance with an exemplary embodiment, the step of sending, by the computer system to the digital ad buying system or an integrated measurement platform, further comprises the following steps: prior to sending the X impression records corresponding to the X estimated advertising impressions, obtaining, by the computer system, from the digital ad buying system, an impression tracking tag associated with a static advertising campaign associated with the static advertisement; configuring, by the computer system, the impression tracking tag so as to append relevant data associated with each impression; and triggering, by the computer system, the impression tracking tag once for each of the X impression records, to register X impressions, including the appended information for each impression, in the digital ad buying system or an integrated measurement platform.

In accordance with an exemplary embodiment, the step of sending, by the computer system to the digital ad buying system or an integrated measurement platform, further comprises the following steps: generating, by the computer system, one bid request for each of the X impression records, using a real-time bidding (RTB) protocol; appending, by the computer system, to each of the bid requests, the impression identifier, the impression timestamp and the Deal ID corresponding to the impression record associated with the bid request; sending, by the computer system, each of the bid requests corresponding to the X impression records, to the digital ad buying system; receiving, by the computer system, from the digital ad buying system, X bid responses to the X bid requests, each of the bid responses containing: pricing information associated with the corresponding Deal ID; at least one creative identifier for the static advertising creative to be displayed; and information necessary for registering one impression in the digital ad buying system; validating, by the computer system, the X bid responses based on a set of criteria; conducting, by the computer system, an auction to identify the X bid responses as X winning bid responses; generating, by the computer system, a win notification record for each of the X winning bid responses; appending, by the computer system, the information from the associated impression record including the advertising identifier and the pricing information to each of the win notifications; and sending, by the computer system, the appended win notification for each winning bid response, to the digital ad buying system.

In accordance with an exemplary embodiment, the step of sending, by the computer system to the digital ad buying system or an integrated measurement platform, further comprises the following steps: generating, by the computer system, one bid request for each of the X impression records, using a real-time bidding (RTB) protocol; appending, by the computer system, to each of the bid requests, the impression identifier, an advertising identifier, the impression timestamp and the Deal ID corresponding to the impression record associated with the bid request; sending, by the computer system, each of the bid requests corresponding to the X impression records, to the digital ad buying system; receiving, by the computer system, from the digital ad buying system, X bid responses to the bid requests, each of the bid responses containing: pricing information associated with the corresponding Deal ID; at least one creative identifier for the static advertising creative to be displayed; and information required for registering one impression in the digital ad buying system; validating, by the computer system, the X bid responses based on a set of criteria; conducting, by the computer system, an auction to identify the X bid responses as X winning bid responses; generating, by the computer system, a win notification record for each of the X winning bid responses; appending, by the computer system, the information from the associated impression record and the pricing information to each of the win notifications; and sending, by the computer system, the appended win notification for each winning bid response, to the digital ad buying system.

In accordance with an exemplary embodiment, the step of sending, by the computer system to the digital ad buying system or an integrated measurement platform, further comprises the following steps: generating, by the computer system, one bid request corresponding to all of the X advertising impressions during the first period of time, using a real-time bidding (RTB) protocol, the one bid request comprising: the estimated number of impressions, X; an identifier for the bid request; a timestamp for the bid request; and the Deal ID; sending, by the computer system, the single bid request to the digital ad buying system; receiving, by the computer system, from the digital ad buying system, one bid response to the bid request, wherein the bid response includes X bids, where X is equal to the estimated number of impressions, each of the X bids comprising: pricing information associated with the Deal ID; at least one creative identifier for the static advertising creative to be displayed; and information required for registering up to X impressions in the digital ad buying system; validating, by the computer system, the bid response received for the bid request, based on a set of criteria; conducting, by the computer system, an auction to identify the X bids as X winning bids; generating, by the computer system, a win notification record for each of the X winning bids in the bid response; appending, by the computer system, to each of the X win notifications, information from a corresponding one of the X impression records; and sending, by the computer system, the win notifications and appended information, to the digital ad buying system.

In accordance with an exemplary embodiment, the step of sending, by the computer system to the digital ad buying system or an integrated measurement platform, is performed in real-time.

In accordance with an exemplary embodiment, the step of sending, by the computer system to the digital ad buying system or an integrated measurement platform, is performed as each unique impression record with appended data becomes available.

In accordance with an exemplary embodiment, the step of sending, by the computer system to the digital ad buying system or an integrated measurement platform, is performed at a regular interval.

In accordance with an exemplary embodiment, the regular interval is at least one of the following: an hour; a plurality of hours; a day; a plurality of days; a week; a plurality of weeks; a duration of the campaign.

In accordance with an exemplary embodiment, the identification of the first period of time during which the static advertisement will be displayed on the first static display comprises: a start date; a start time; an end date; and an end time.

In accordance with an exemplary embodiment, the step of sending, by the computer system to the digital ad buying system or an integrated measurement platform, further comprises determining, by the computer system, whether to send the unique impression record for each impression to the digital ad buying system based on a set of filtering criteria.

In accordance with an exemplary embodiment, the set of filtering criteria comprises at least one of the following: verifying, by the computer system, that a current date is after both a start date and start time and the current date is before both an end date and an end time; verifying, by the computer system, that the Deal ID is valid; verifying, by the computer system, that the at least one creative identifier is valid; verifying, by the computer system, that the display ID is valid; verifying, by the computer system, that there are no applicable restrictions pertaining to displaying the static advertisement creative on the first static display; verifying, by the computer system, that the first seller has approved the static advertising creative; verifying, by the computer system, that the buyer price is above a floor set by the first seller; verifying, by the computer system, that a total spend delivered at a point in time does not exceed an overall monetary budget set by the first seller; verifying, by the computer system, that total impressions delivered at a point in time does not exceed an overall impression budget set by the first seller; or verifying, by the computer system, that the actual campaign pacing has not exceeded either: the desired monetary pacing level for the campaign; or the desired impression pacing level for the campaign; verifying, by the computer system, that multiple impressions within a given session do not correspond to the same advertising identifier, where a session is a second period of time within the first period of time.

In accordance with an exemplary embodiment, the identification of the first static display of the one or more static displays comprises at least one of the following: a unique display identifier; or a precise location of the specific static display.

In accordance with an exemplary embodiment, the device-specific advertising identifier comprises at least one of: mobile advertising IDs; browser cookies; account usernames; e-mail addresses; or hashed e-mail address tokens.

In accordance with an exemplary embodiment, wherein in the step of appending, by the computer system, information: upon the condition that the advertising identifier information in the impression record includes the device-specific advertising identifier associated with a corresponding one of the one or more observed personal electronic devices, the impression timestamp indicating the time the impression occurred is the same as the observation timestamp associated with the observation of the corresponding one of the one or more observed personal electronic devices, and upon the condition that the advertising identifier in the impression record includes one of the X unique placeholder advertising identifiers, the impression timestamp is a point in time during the first time period.

In accordance with an exemplary embodiment, the point in time is randomly selected, a first point in time during the first time period, a last point in time during the first time period, or a midpoint time of the first time period.

DESCRIPTION OF THE DRAWINGS

Exemplary embodiments of the present invention will be described with references to the accompanying figures, wherein.

DETAILED DESCRIPTION

Figure 1:
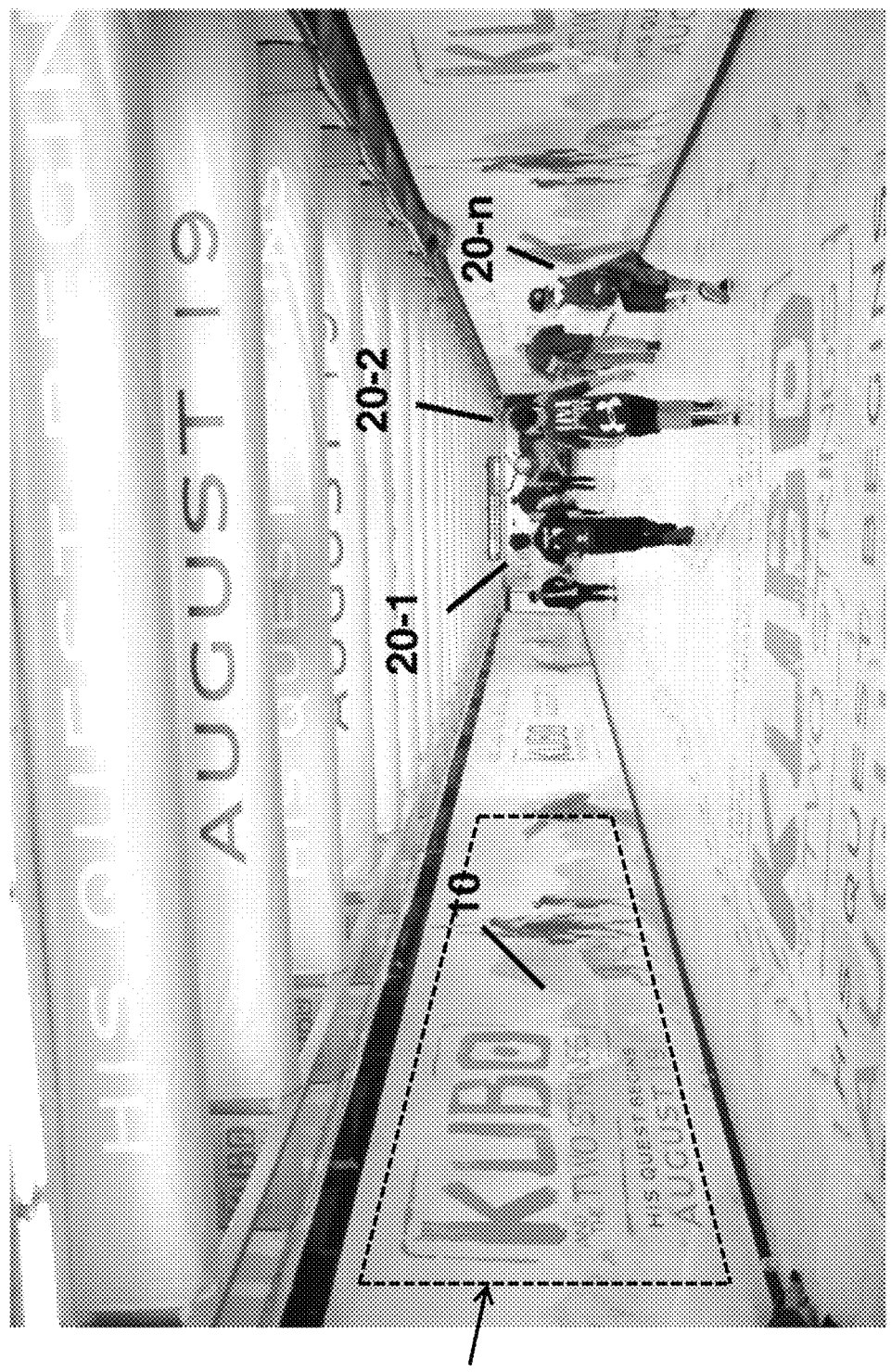
FIG. 1 illustrates an exemplary environment in accordance with exemplary embodiments of the present invention in which a static advertisement is displayed on a static display at a public location.

The present invention generally relates to systems and methods for dynamically tracking delivery and performance of static advertisements placed at physical locations and integrating, displaying, and reporting, in digital advertising systems, impressions and events that are associated with the static advertisements.

For purposes of the present disclosure, the term "static display" refers to non-digital displays, and the term "static advertisement" refers to non-digital advertisements that may be displayed on such static displays, an example of which is an advertisement placed on a billboard. It should be appreciated that exemplary embodiments of the present invention are generally described in the context of advertisements that do not change significantly or at all over the time period in which such advertisements are displayed, and accordingly the term "static" is used herein to refer to such advertisements. In exemplary embodiments the advertisements are displayed and remain unchanged for an extended period of time, such as, for example, one or more weeks, or one or more months, to name a few As discussed above, the present invention seeks to address the computer problem of how to track delivery of static advertisements that are displayed at public or semi-public physical locations, and match those static advertisements with "impressions" (digital records of the display of an advertisement to an individual) and "events" (consumer actions taken on personal electronic devices in response to the impressions), in a manner that can be easily integrated into digital advertising systems (e.g., ad serving systems and demand-side platforms) that currently enable campaign measurement, reporting, analytics, attribution, optimization and other functions in cases where impressions and events both occur on personal electronic devices.

More specifically, a technical problem arises as it is not possible to use known tracking means which determine an advertisement was viewed on a personal electronic device (or another electronic device linked to the personal electronic device), and further that an action was taken (such as a purchase) associated with an advertisement viewed on the personal electronic device (or another electronic device linked to the personal electronic device). Because the advertisement is not displayed on such a personal electronic device (or an electronic device linked to the personal device) known tracking means are not possible and thus digital advertisement systems are not able to measure the effectiveness of a static advertisement campaign in public or semi-public spaces.

A personal electronic device may be, for example, a mobile telephone, a tablet, a laptop or desktop computer, a watch, a wearable device, or a television, to name a few—all of which may be associated with a particular user. A device linked to a personal electronic device may be a second electronic device of a particular user or may be a device of a further user who is linked to that particular user. The further user may be a family member.

In exemplary embodiments, the present invention provides a technical solution by the provision of a technical system to allow for the tracking of an advertisement which is not displayed on a personal electronic device (or a device linked to a personal electronic device). A technical system is provided which allows an advertisement which is not displayed on a personal electronic device (or another electronic device linked to the personal electronic device) to be associated with a personal electronic device (or an electronic device linked to the personal electronic device) using technical means.

In general, in an exemplary embodiment the technical means may involve collection of observation data and comparison of the collected observation data with a predetermined display viewing region (or "viewing geometry") to determine if a consumer may have been exposed to a particular static advertisement displayed at the static display during a time period in which the static advertisement is posted. The observation data may be used to generate impression records to be sent to an ad buying system. The association of observation data from personal electronic devices of consumers exposed to the static advertisement with impression data in the ad buying system, allows for the attribution of subsequent consumer actions (such as purchases) and measurement of the static advertising campaign performance within digital ad buying systems in exactly the same ways as is done for digital advertising. Device-specific identifiers for the electronic devices, or other devices owned by consumers, may be used to correlate impressions (based on observed electronic devices within a viewing geometry of the static advertisement) with subsequent actions associated with the static advertisement (either in direct response to a call-to-action or otherwise), so that the effectiveness of a static advertising campaign may be measured using digital advertisement attribution techniques.

In exemplary embodiments, the present invention solves the technical challenge by implementing unconventional and non-routine physical-to-digital adaptor technology that links the contracting and fulfillment process for static advertising with digital campaigns in existing digital ad buying systems to allow static advertisements to be tracked within the same systems and to provide the same delivery and performance metrics as those associated with digital advertisements. For example, in accordance with exemplary embodiments of the present invention, observation data associated with personal electronic devices is collected and compared with a predetermined display viewing region (or "viewing geometry") to determine if a consumer may have been exposed to a particular static advertisement displayed at the static display during a time period in which the static advertisement is posted, and the observation data is used to generate impression records to be sent to an ad buying system with the impression data being associated with a private deal (e.g., a DealID) that is pre-generated within the digital ad buying system. The association of observation data from personal electronic devices of consumers exposed to the static advertisement with impression data in the ad buying system, allows for the attribution of subsequent consumer actions (such as purchases) and measurement of the static advertising campaign performance within digital ad buying systems in exactly the same ways as is done for digital advertising. The impression records may be sent to the digital ad buying system along with tracked information indicating call-to-action responses (i.e., direct consumer responses to a call to action with the static advertisement) occurring on the personal electronic devices so that the call-to-action responses can also be attributed to the impressions, as "clicks". In embodiments, the present invention can be implemented in and integrated into digital advertising systems without requiring such systems to be modified. Despite a long-felt need to directly associate views of a static advertisement with subsequent consumer events on a personal electronic device, so that such impressions and events may be tracked within a cross-platform advertising campaign in the same way as for digital advertising, to date, such a solution has not been realized.

Figure 2:
FIG. 2 illustrates an exemplary environment in accordance with exemplary embodiments of the present invention in which a static advertisement is displayed on a static display at a public location.

FIGS. 1 and 2 illustrate exemplary environments in accordance with the exemplary embodiments of the present invention in which a static advertisement is displayed at a public location. At any given period in time, individuals 20-1 . . . 20-n, who may possess one or more personal electronic devices 21-1 . . . 21-n (referenced in FIG. 3), such as mobile phones, tablets, and laptop computers, to name a few, may view a static advertisement 10 displayed at a public location on a static display 12. FIG. 1 shows the static advertisement 10 as a poster within a subway, while FIG. 2 shows the static advertisement 10 as a poster or panel affixed to the side of a bus. In this regard, it should be appreciated that the term "static display" does not limit the present invention to stationary displays, but also encompasses displays that are situated on moving platforms, such as, for example, vehicles (e.g. buses, trains, airplanes), conveyors, etc. It should be appreciated that the static advertisement 10 may have any static advertisement format, such as, for example, signage, wrapping, window decals, billboards, posters, aerial advertising, brochure distribution, commuter rail displays, inflatable billboards, lamppost banner advertising, mobile billboards, premiere panels, premiere squares, street advertising, taxi-top advertising, wallscapes, and aircraft advertising, to name a few.

After viewing the static advertisement 10, one or more of the individuals 20-1 . . . 20-n may access their personal electronic devices 21-1 . . . 21-n, or another device they own, to perform an electronic action associated with the digital advertisement 10. For example, if a "call-to-action" is present in the static advertisement, one or more of the individuals 20-1 . . . 20-n may respond to such "call-to-action" prompted by the static advertisement 10, on their respective personal electronic devices 21-1 . . . 21-n, such as by inputting a coupon code, scanning a QR code, accessing a unique URL address, calling a unique call-tracking telephone number, using a unique SMS short code, using a unique social media hashtag, or sending a message to a unique email address, to name a few. More generally, absent any specific call-to-action in the static advertisement, one or more of the individuals 20-1 . . . 20-n may perform some other subsequent action either on their respective personal electronic devices 21-1 . . . 21-n, or another device they own, that is related to the static advertisement (but not related to a specific call-to-action), such as navigating to a website of an advertised product or purchasing an item related to the advertisement. As explained below, device-specific identifiers for the electronic devices 21-1 . . . 21-n, or other devices owned by consumers 20-1 . . . 20-n, may be used to correlate impressions (based on observed electronic devices 21-1 . . . 21-n within a viewing geometry of the static advertisement 10) with subsequent actions associated with the static advertisement 10 (either in direct response to a call-to-action or otherwise), so that the effectiveness of a static advertising campaign may be measured using digital advertisement attribution techniques.

Figure 3:
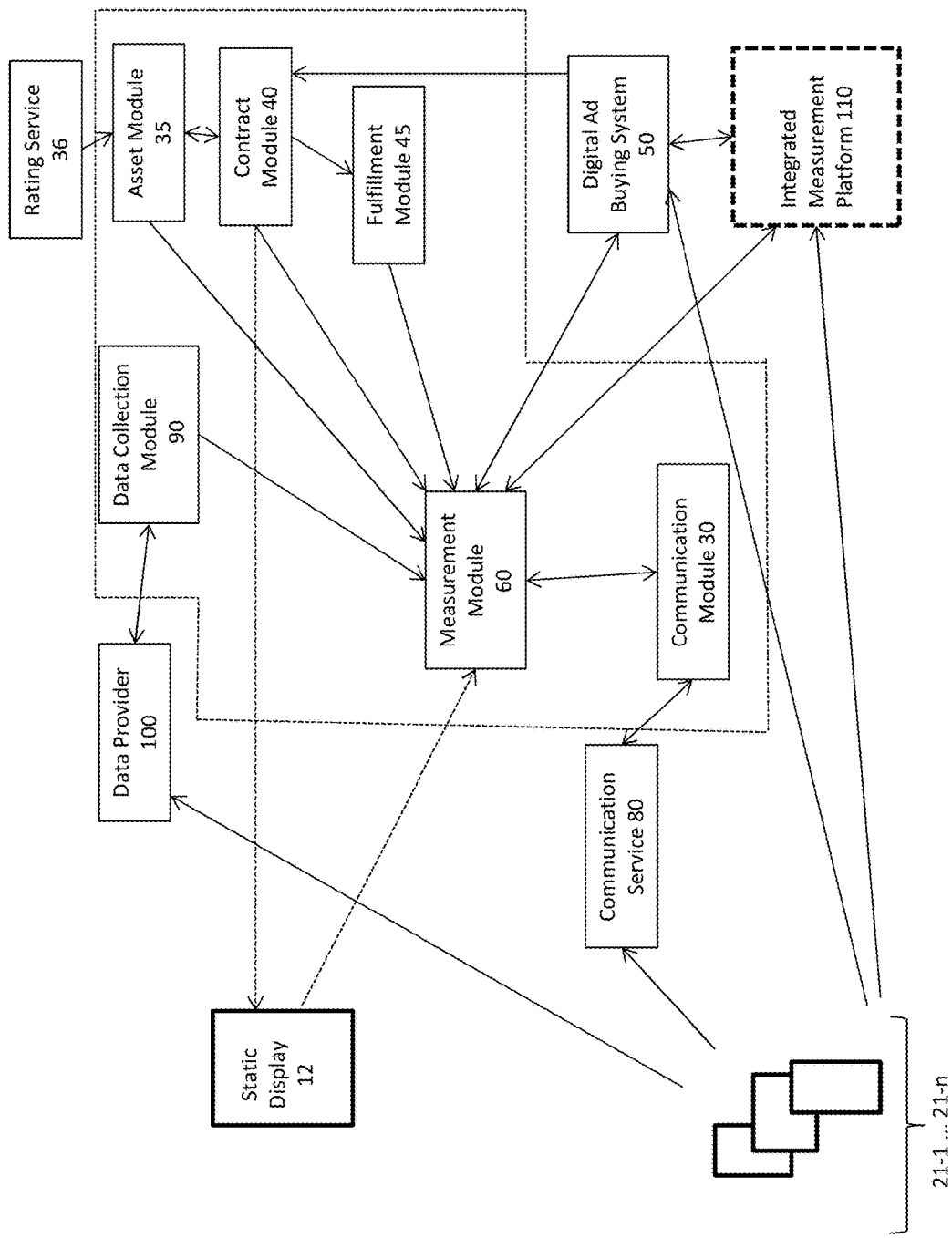
FIG. 3 illustrates an exemplary configuration of participant systems and platforms in accordance with exemplary embodiments of the present invention.

FIG. 3 illustrates an exemplary configuration of participant systems and platforms in accordance with exemplary embodiments of the present invention. It will be appreciated that each of the devices, systems and platforms illustrated in FIG. 3 are represented as a single unit, but may be comprised of one or more units or may be parts of a larger aggregated unit that performs multiple functions.

As illustrated in FIG. 3, components of the computer system in accordance with exemplary embodiments may include a communications module 30, a measurement module 60, an asset module 35, a contract module 40, a fulfillment module 45 and a data collection module 90, to name a few. These components may be connected either directly or through a network connection (such as the Internet) and interact (also either directly or via network connection) with other devices, systems and platforms within an operating environment to carry out the various aspects of the present invention. For example, the operating environment may include a rating service 36, a communication service 80, a digital ad buying system 50, an integrated measurement platform 110 and a data provider 100, to name a few. Although the communication module 30, the measurement module 60, the asset module 35, the contract module 40, the fulfillment module 45 and the data collection module 90 are shown as separate components, it should be appreciated that these components may be modules of one or more components, or may be embodied in a single component having all of the functionality of these components. Further, it should be appreciated that these components may be associated with a computer-readable medium coupled to one or more data processing apparatus having instructions stored thereon which, when executed by the one or more data processing apparatus, cause the one or more data processing apparatus to perform the processes described herein.

Figure 4:
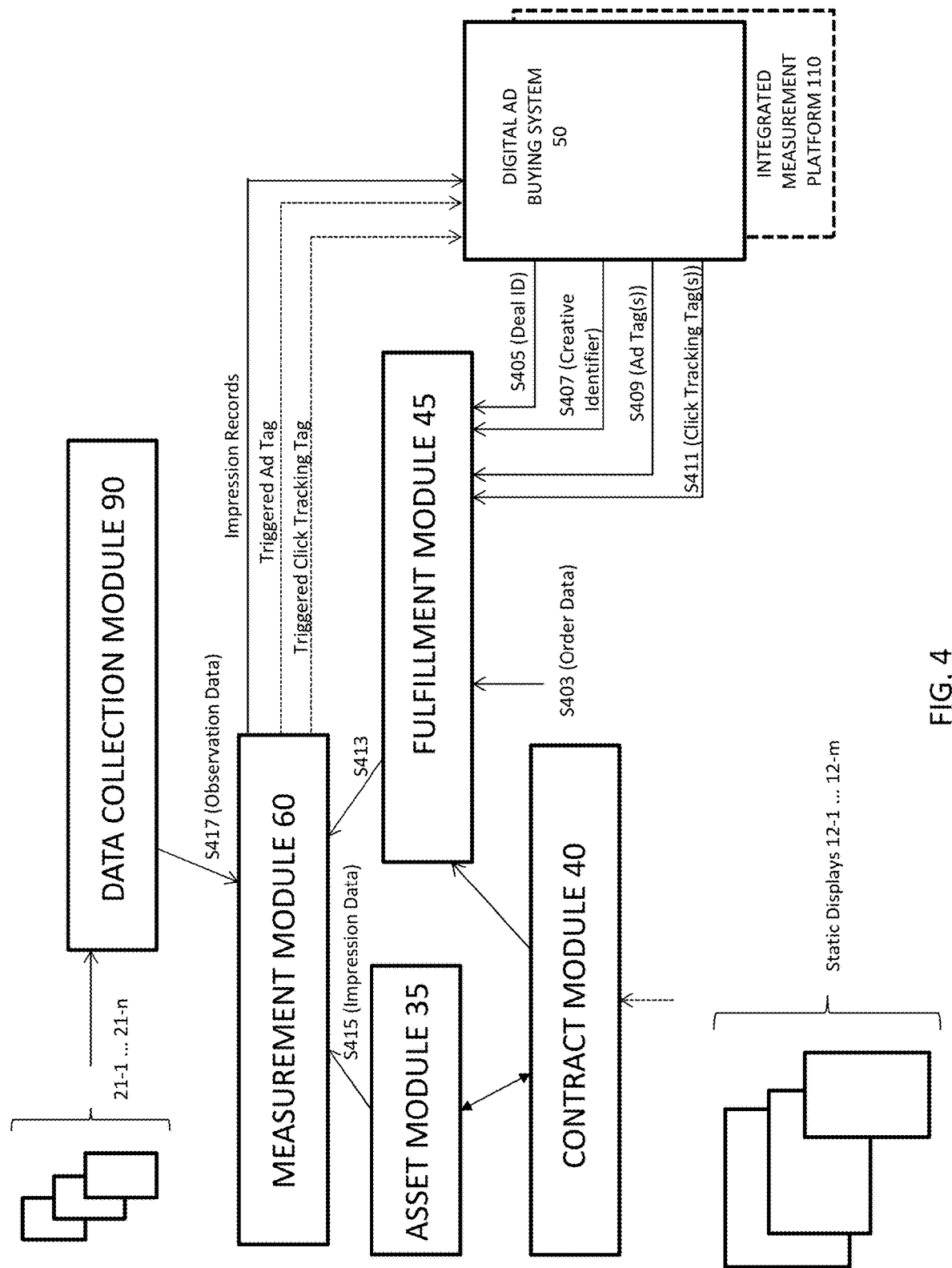
FIG. 4 is a block diagram illustrating a conceptual process flow in accordance with exemplary embodiments of the present invention.
Figure 5:
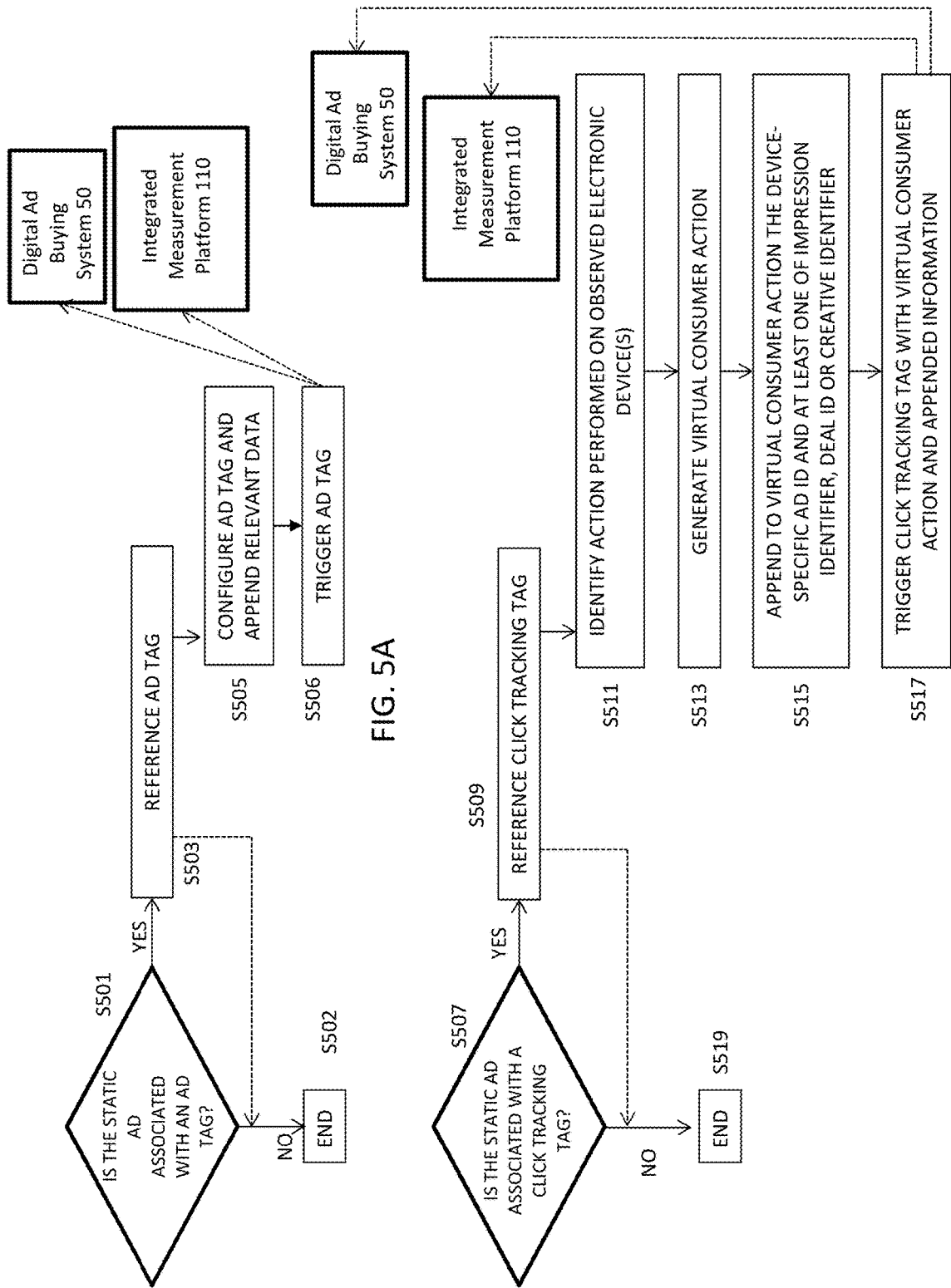
FIG. 5A is a flow chart showing a process for utilizing ad tags to record impressions and related data associated with a static advertisement according to an exemplary embodiment of the present invention.
FIG. 5B is a flow chart showing a process for utilizing click tracking tags to record click and related data associated with a static advertisement according to an exemplary embodiment of the present invention.

FIG. 4 illustrates the general process flow of a method according to an exemplary embodiment of the present invention. In accordance with exemplary embodiments of the present invention, the process may involve sharing of data between the contract module 40 and the fulfillment module 45 to allow for printing and posting of work-orders and posting of confirmations (proof-of-play) associated with a static advertising campaign. This step may involve conforming the static advertising creative (i.e., the image itself) to support capabilities of the various components of the present invention, such as, for example, integration of a call-to-action or other parameters associated with the campaign into the printing of the static advertisement. A DealID may be generated at the digital ad buying system 50 that can subsequently be associated with impressions to consumers 20-1 . . . 20-n who view the static advertisement, and to subsequent actions taken by those consumers on their respective devices 21-1 . . . 21-n, or other personal devices owned by those consumers. Tracking pixels and/or API calls may also be extracted from the digital ad buying system 50 for either impressions or impressions and clicks associated with the personal electronic devices. Further details of these processes are described below with reference to FIGS. 5-9.

After posting of the static advertisement, the data collection module 90 may obtain observation data associated with the one or more personal electronic devices 21-1 . . . 21-n, including, for example, mobile advertising IDs, longitude, latitude and time of the observation. The measurement module 60 may associate the observations with one or more impressions for input to the digital ad buying system 50 or integrated measurement platform 110. This step may involve comparison of the observation records with a modeled viewing perimeter or area (i.e., "viewing geometry") associated with the static display to determine those observation records that may be associated with consumers that had the opportunity to view the static advertisement. The impression records may be sent to the digital ad buying system 50 or integrated measurement platform 110 through a dedicated API or by creating a virtual auction tied to the previously generated DealID. Further details of these processes are described herein with reference to FIGS. 5-9.

Direct responses to a call-to-action, performed on the one or more personal electronic devices 21-1 . . . 21-n may be tracked by the measurement module 60 (through the communication service 80, as necessary) to generate click records that may be correlated with the impression records at the digital ad buying system 50 or integrated measurement platform 110 for attribution and other measurement purposes. For example, a consumer using a first personal electronic device may respond to a call-to-action by texting an SMS short code or navigating to a specified website based on information provided in the static advertisement, and in response the measurement module 60 may generate an electronic click event, for delivery to the digital ad buying system 50 or integrated measurement platform 110. In this regard, the measurement module 60 may correlate the call-to-action event with a tracking pixel from the digital ad buying system, associated with the static advertising campaign. The tracking pixel may be generated by either the digital ad buying system 50 or integrated measurement platform 110, or it may be extracted by the measurement module 60 from a bid response sent from the digital ad buying system 50. Further details of these processes are described herein with reference to FIGS. 5-9.

Enabling of impression and click tracking above, as well as capturing of observation data for personal electronic devices, enables the process of "attribution" in ad buying platforms to determine if static advertisements run through this process generated marketer-desired consumer actions, either on the personal electronic devices recorded in the observation, or on other devices owned by those consumers. In this regard, ad buying platform event pixels/tags may already collect such events (e.g., purchases on websites, downloading of mobile apps, etc.), in which case the ad buying system "attribution" process (or equivalent process in an integrated measurement platform) should now be provided with properly formatted preceding impressions and clicks to associate to those events, in precisely the same manner as is done for digital advertising campaigns. This same approach also enables digital ad buying systems to perform other important functions using this data, such as campaign planning, campaign optimization, audience analytics, and retargeting, to name a few.

Figure 10:
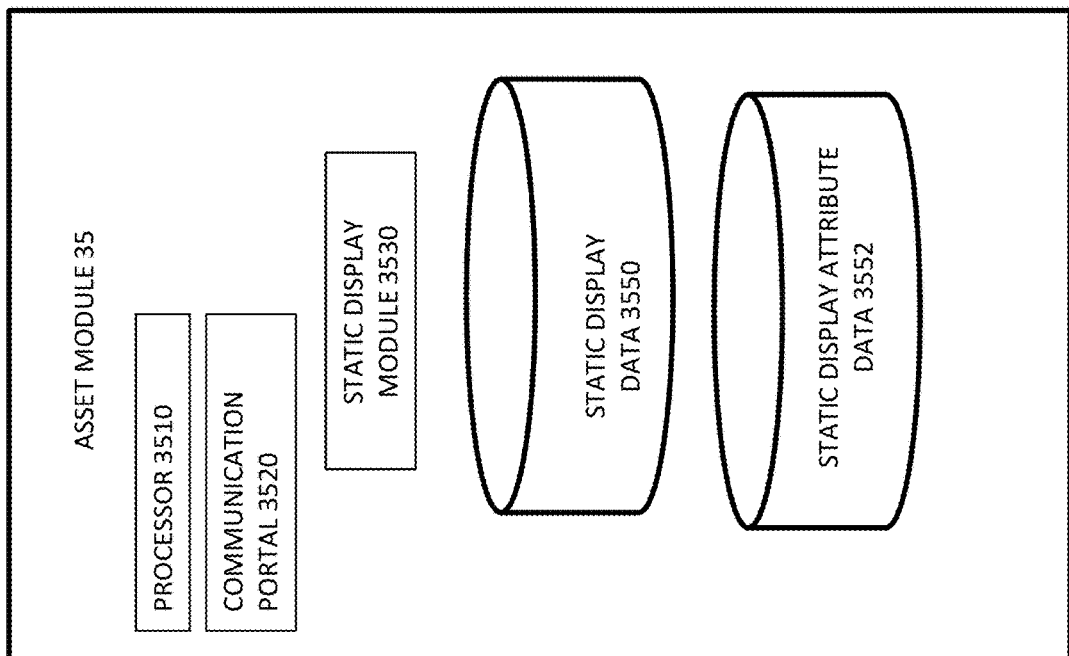
FIG. 10 is a representative block diagram of an asset module in accordance with exemplary embodiments of the present invention.

In embodiments, the asset module 35 may include computer hardware and/or software components that are configured to acquire and store data associated with one or more static displays 12-1 . . . 12-m. As shown in FIG. 10, the asset module 35 may include one or more processors 3510 and a communication portal 3520 (e.g., for sending and/or receiving data). The one or more processors 3510 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. The asset module 35 can also include non-transitory computer-readable memory with one or more databases and data stored thereon. The memory may comprise electronic memories such as random access memory (RAM), read-only memory (ROM), or other types of memory, in any combination. Data stored on the memory can include, for example, static display data 3550 and static display attribute data 3552. One or more software modules may be stored in the memory and running or configured to run on the one or more processors 3510. Such modules can include a static display module 3530. The processes performed by such modules, the data produced thereby and/or the data accessed thereby are described herein.

The asset module 35 may acquire and store static display data 3550 such as, for example, static display location data and static display attribute data associated with each of the static displays 12-1 . . . 12-m. In embodiments, the locations of the static displays may be defined based on, for example, compass data (e.g. longitude and latitude), Geohash data, transit route data, transit schedule data, vehicle speed data, and/or real-time tracking data. In embodiments, static display attribute data may include, for example, a seller name, a seller ID, a name of a seller network with which the display is associated, an ID of a seller network with which the display is associated, a display name, a display ID, physical dimensions, directional orientation, lighting characteristics, movement characteristics, a projected number of viewers, prohibited content, zoning restrictions and/or lead-time required for posting, to name a few. The asset module 35 may store information associated with restrictions associated with static displays, such as, for example, one or more of the following: where static advertisements can be placed (e.g., billboards, bus-frames, phone-booths, window decals, floor vinyl clings, hang banners, etc.); what kind of static advertisements can be run in what location (e.g. different billboard sizes, or bus-side frames that can hold one of several sizes of static advertisements, some of which would occupy the same space); which of those locations have already been sold, and to whom; restrictions around posting (e.g., content restrictions, areas near schools and places of worship that cannot run alcohol advertisements, local standards about speech, political ads, etc.). The asset module 35 also acquires and stores an impression estimate X associated with the static displays. The impression estimate X may be obtained based on rating agency data obtained from rating agencies (e.g., rating service 36), network connection data obtained from network connections, sensor data collected from one or more sensors, observation data and/or mobile application data obtained from one or more mobile applications. The impression estimate X is used by the measurement module 60 (step S415 in FIG. 4) as described herein.

Figure 11:
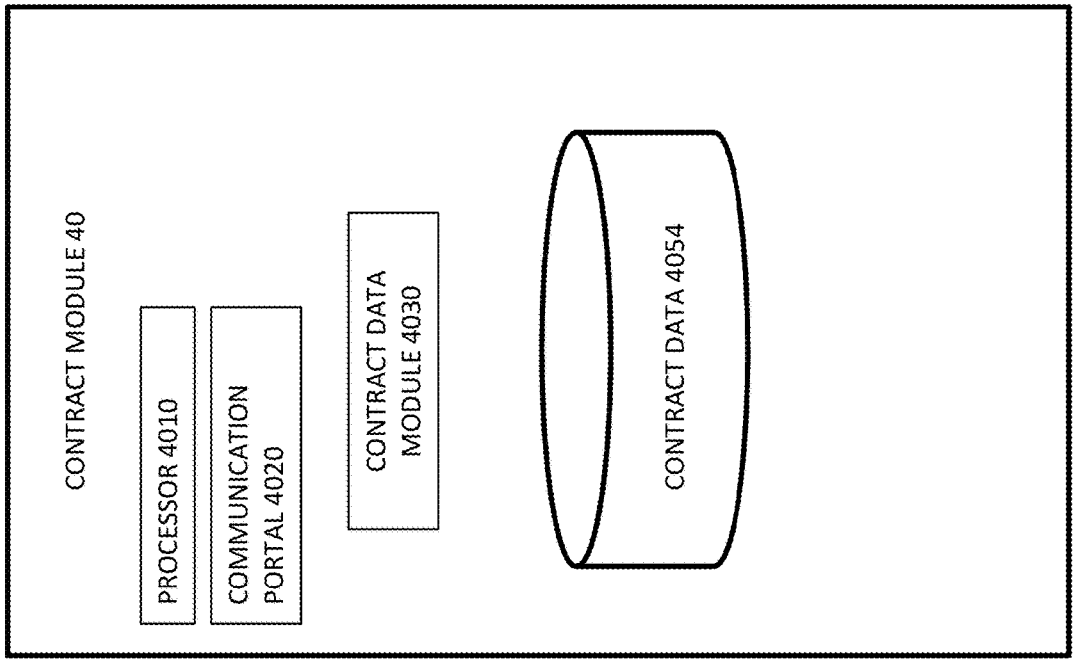
FIG. 11 is a representative block diagram of a contract module in accordance with exemplary embodiments of the present invention.

In embodiments, the contract module 40 may include computer hardware and/or software components that are configured to acquire and store information pertaining to individual contracts associated with the purchase of and execution of static advertisements at one or more static display locations as part of one or more static advertising campaigns. As shown in FIG. 11, the contract module 40 may include one or more processors 4010 and a communication portal 4020 (e.g., for sending and/or receiving data). The one or more processors 4010 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. The contract module 40 can also include non-transitory computer-readable memory with one or more databases and data stored thereon. The memory may comprise electronic memories such as random access memory (RAM), read-only memory (ROM), or other types of memory, in any combination. Data stored on the memory can include, for example, contract data 4054. One or more software modules may be stored in the memory and running or configured to run on the one or more processors 4010. Such modules can include a contract data module 4030. The processes performed by such modules, the data produced thereby and/or the data accessed thereby are described herein.

Figure 12:
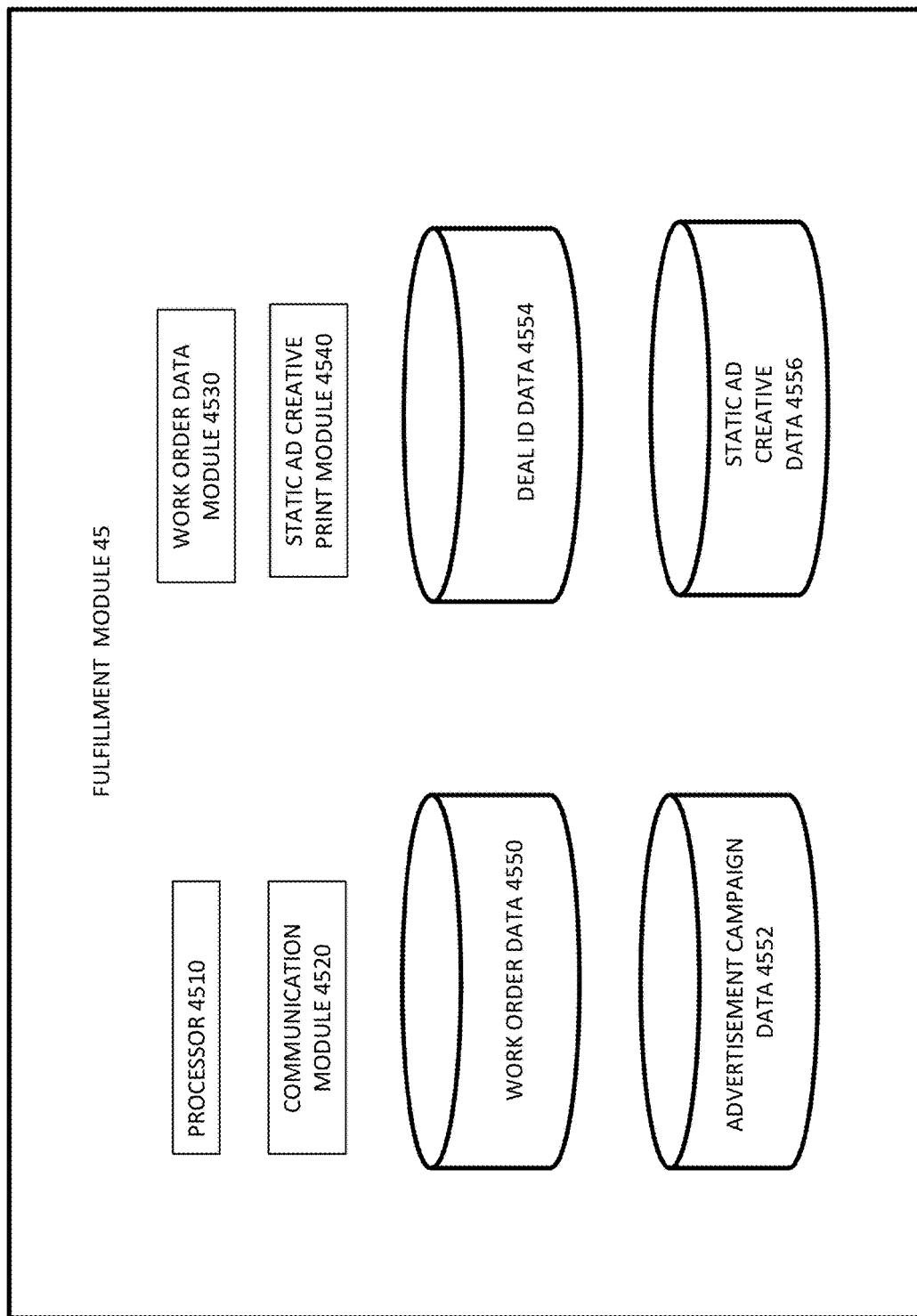
FIG. 12 is a representative block diagram of a fulfillment module in accordance with exemplary embodiments of the present invention.

As shown in FIG. 12, the fulfillment module 45 may include one or more processors 4510 and a communication portal 4520 (e.g., for sending and/or receiving data). The one or more processors 4510 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. The contract module 45 can also include non-transitory computer-readable memory with one or more databases and data stored thereon. The memory may comprise electronic memories such as random access memory (RAM), read-only memory (ROM), or other types of memory, in any combination. Data stored on the memory can include work order data 4550, advertising campaign data 4552, Deal ID data 4554 and static advertisement creative data 4556, to name a few. One or more software modules may be stored in the memory and running or configured to run on the one or more processors 4510. Such modules can include a work order data module 4530 and a static advertisement creative print module 4540, to name a few. The processes performed by such modules, the data produced thereby and/or the data accessed thereby are described herein.

In embodiments, the fulfillment module 45 may include computer hardware and/or software components that are configured for fulfillment of specific static advertising contracts. For example, the fulfillment module 45 may allow for input and processing of an electronic order form associated with a static advertising campaign, including automated review of the order form to ensure completeness and accuracy of information. The fulfillment module 45 may dynamically map order form parameters to specific panels and screens based on specific availability and characteristics. In this regard, as indicated by step S403 in FIG. 4, the fulfillment module 45 may receive from a seller of static display inventory order data associated with an order for display of a static advertising creative for a period of time at one or more static displays. The order data may include, for example, corresponding identifications of the one or more static displays, an identification of the period of time during which the static advertisement will be displayed, a buyer price that a buyer will pay for the order, an indication of whether or not a call-to-action is embedded within the static advertising creative, and upon a condition a call-to-action is embedded within the static advertisement, attributes associated with the call-to-action. The period of time may be defined by, for example, a start date, start time, end date and end time. Identifications of a static display may include a unique display identifier (e.g., "display IDs") and/or a precise location of the static display.

If a call-to-action is associated with the static advertising creative, attributes of the call-to-action may include, for example, a unique identifier, a URL and/or a keyword associated with the call-to-action, to name a few. However, it should be appreciated that in exemplary embodiments a call-to-action need not be associated with the static advertising creative, and is not necessary to enable attribution within the ad buying system on integrated measurement platform.

The buyer price may be specified by, for example: a cost per thousand impressions (CPM); a cost per thousand impressions delivered to a particular target audience, based on a set of predetermined audience characteristics; a fixed total amount for a duration of an advertising campaign; a rate of price per unit time; a cost per "click" (CPC) where a click is represented by executing the call-to-action associated with the static advertising creative; a cost per "action" (CPA) where an action is represented by a desired action (e.g. a purchase) taken by a consumer, following exposure to a static advertisement; a "dynamic CPM" (DCPM) where the cost per thousand impressions is adjusted based on the performance of the static advertisement (e.g., "clicks", "actions", etc.); and/or a cost per thousand impressions delivered in accordance with a set of target circumstances (e.g., time(s) of day, weather conditions, proximity to specific event(s)) where the price may be dynamically calculated based on matching specified criteria, to name a few. In embodiments, the order for the static advertisement may be associated with an advertising campaign, so that the order data may further include information such as, for example, a total monetary budget associated with the advertising campaign, a total impression budget associated with the advertising campaign, a time interval for calculating monetary pacing associated with an advertising campaign, a target monetary pacing level associated with the advertising campaign, a time interval for calculating impression pacing associated with the advertising campaign and/or a target impression pacing level associated with the advertising campaign.

In embodiments, the fulfillment module 45 may associate static advertising campaigns with a private deal in which a unique identifier is generated to represent the terms of the deal that was made between the buyer and seller (i.e., a "Deal ID") for a static advertising campaign. In this regard, as indicated by step S405, the fulfillment module 45 may receive the Deal ID as instantiated in the digital ad buying system 50 by the buyer of the order, and, as indicated by step S407, further receive from the digital ad buying system 50 one or more creative identifiers associated with the one or more static advertising creatives. The fulfillment module 45 may further receive one or more ad tags (step S409) and/or one or more click tracking tags (step S411) associated with the one or more static advertising creatives. The one or more ad tags may be, for example, an impression tracking tag from the digital ad buying system 50, a third-party impression tracking tag, measurement code from the digital ad buying system 50 (configured for measurement of characteristics associated with delivery of the static advertising creative) and/or measurement code from a third-party system (configured for measurement of characteristics associated with delivery of the static advertising creative). In this context, a "third-party system" may be, for example, an ad server, an ad verification system and/or an attribution or measurement system (e.g., the integrated measurement system 110 shown in FIG. 4). The one or more click tracking tags may be provided to record electronic events initiated on one more observed personal electronic devices (to be explained in more detail below) associated with at least one consumer in direct response to a call-to-action embedded in the static advertising creative.

In embodiments, the fulfillment module 45 may receive an order for display of a static advertising creative from a seller computer system, and as part of the order processing, may associate the order with information received from a digital ad buying system 50, as explained in further detail herein. The fulfillment module 45 may then generate instructions for printing of the static advertising creative, which may define specific parameters of the static advertisement, such as, for example, sizing, orientation and customization of content. The specific parameters may conform to the associated requirements of the private deal within the digital ad buying system 50. For example, if a digital call-to-action is required, then the printing instructions may include the specifics necessary to print the call-to-action information within the static advertisement, such as, for example, printing of a coupon code, QR code, call-tracking phone number, to name a few. In this regard, the call-to-action information may be translated into consumer-visible creative modifications (e.g., insertion of directions to visit "link.nyc/advertiser", or "Send SMS to 33333", or insertion of a QR code or other mechanism to direct mobile phones to visit a website to enable conversion tracking). This information can then be inserted into the printing process for posters, vinyl wraps, banners, etc.

Figure 13:
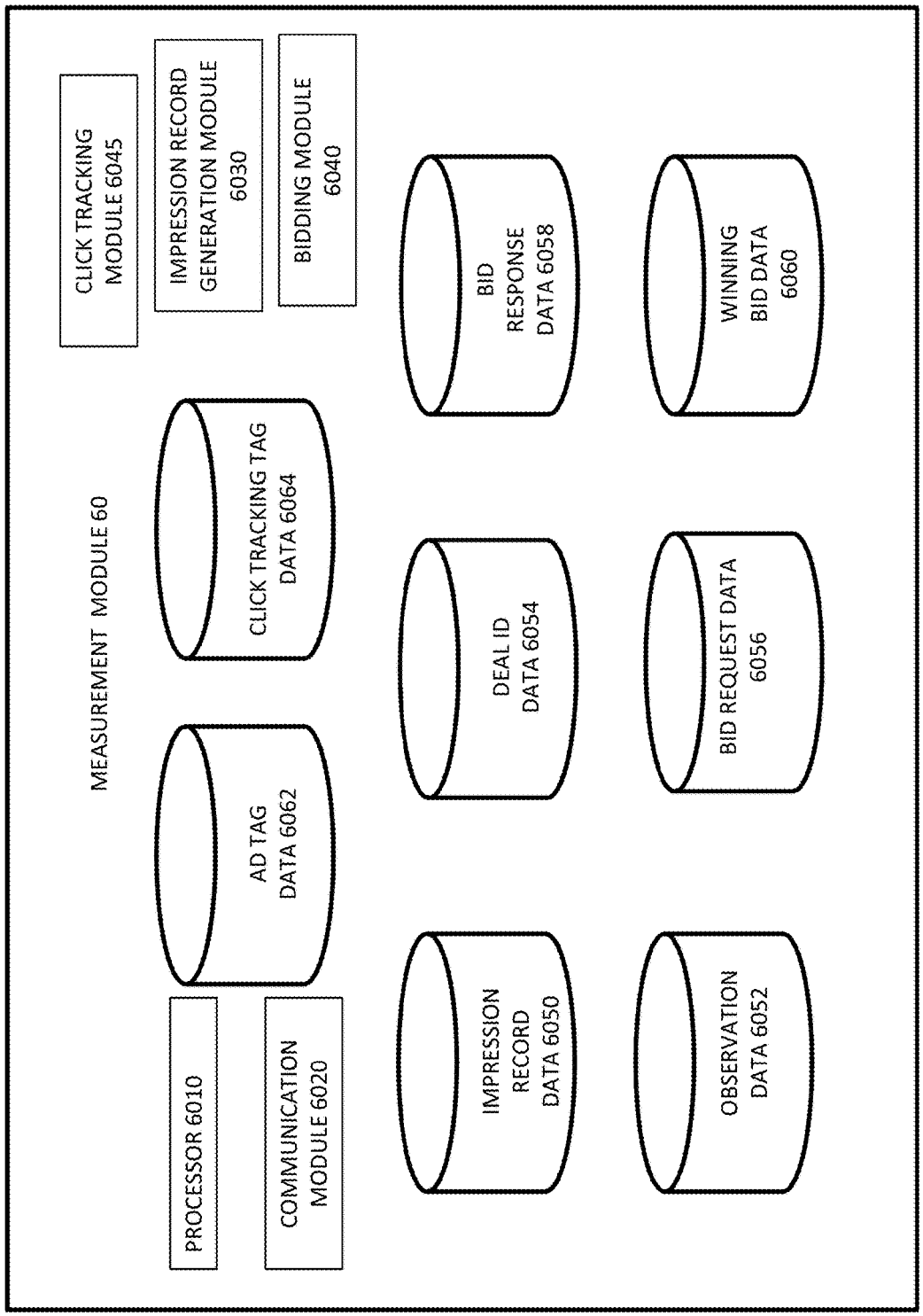
FIG. 13 is a representative block diagram of a measurement module in accordance with exemplary embodiments of the present invention.

As shown in FIG. 13, the measurement module 60 may include one or more processors 6010 and a communication portal 6020 (e.g., for sending and/or receiving data). The one or more processors 6010 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. The measurement module 60 can also include non-transitory computer-readable memory with one or more databases and data stored thereon. The memory may comprise electronic memories such as random access memory (RAM), read-only memory (ROM), or other types of memory, in any combination. Data stored on the memory can include impression record data 6050, observation data 6052, Deal ID data 6054, bid request data 6056, bid response data 6058, winning bid data 6060, ad tag data 6062 and click tracking tag data 6064, to name a few. One or more software modules may be stored in the memory and running or configured to run on the one or more processors 6010. Such modules can include an impression record generation module 6030, a bidding module 6040 and a click tracking module 6045, to name a few. The processes performed by such modules, the data produced thereby and/or the data accessed thereby are described herein.

As indicated by step S413 in FIG. 4, the order data and associated information received from the digital ad buying system 50 through the fulfillment module 45 are sent to the measurement module 60 to allow the measurement module 60 to generate impression records associated with the static advertisement. In embodiments, the measurement module 60 may be configured to translate posting of a static advertisement into a measurement of impressions within the digital ad buying system 50. In this regard, the measurement module 60 may be configured to generate X impression records associated with X estimated advertising impressions, each having a unique placeholder advertising identifier. The number X of estimated advertising impressions may be calculated by the measurement platform 60 based on estimation data received and/or obtained by the asset module 35 (step S415). Such estimation data may include, for example, rating agency data, network connection data, sensor data, observation data and/or mobile application data, and/or a combination of these types of data, to name a few. In exemplary embodiments, the impression estimate calculation may be performed in real-time, as advertising impression information becomes available, or at a regular interval. The regular interval may be, for example, one hour, a plurality of hours, one day, a plurality of days, one week, a plurality of weeks and/or an entire duration of an advertising campaign. The measurement module 60 may adjust the number X of estimated advertising impressions to account for factors such as, for example, time of day, day of week, seasonality data skew, observational data skew, real-time network activity and/or real-time sensor data.

As explained in further detail below, the measurement module 60 may be configured to append to each impression record a corresponding impression identifier, a corresponding impression timestamp, a corresponding advertising identifier, a corresponding Deal ID, a corresponding impression price of each impression and the corresponding creative identifier associated with the static advertising creative. In embodiments, the appended information may include information associated with observations obtained at the locations and times associated with a static advertising campaign. In this regard, the measurement platform 60 may use geospatial modeling techniques to determine the anticipated viewing region of a static display ("viewing geometry") and match one or more of the observations with one or more viewing geometries, thereby indicating a consumer carrying an observed personal electronic device had the opportunity to view the static advertisement displayed at the static display.

In embodiments, the measurement module 60 may operate with one or more application program interfaces ("APIs") of the digital ad buying system 50, by generating API calls to the digital ad buying system 50 to convey one or more impression records. In this regard, if the digital ad buying system 50 may support a dedicated tracking mode, the measurement platform 60 may place the impression records in an appropriate format before delivery to the digital ad buying system 50. Otherwise, as explained in more detail below, in embodiments where the digital ad buying system 50 may support a real-time bidding (RTB) mode, the measurement platform 60 may generate a "bid request" associated with a previously generated DealID to inform the digital ad buying platform 50 of the opportunity to record impressions for the campaign identified in the digital ad buying platform by the DealID. One or more "virtual auctions" with a single buyer in the digital ad buying platform may then be executed to record the one or more impressions in the digital ad buying system 50, and a notification may be sent to an API of the digital ad buying system 50 to confirm the winning of the one or more auctions in order to create the information necessary to record impression transactions, and enable attribution of subsequent consumer actions.

As indicated by step S417, the data collection module 90 may be configured to receive and/or obtain observation data associated with one or more observed personal electronic devices. The observation data for each of the one or more observed personal electronic devices may include, for example, a device-specific advertising identifier, location data associated with the observed personal electronic device and an observation timestamp indicating a time an observation occurred. In exemplary embodiments, the observation data may be collected in real-time, as the observation data becomes available or at a regular interval. The regular interval may be, for example, one hour, a plurality of hours, one day, a plurality of days, one week, a plurality of weeks and/or an entire duration of an advertising campaign. In exemplary embodiments, the observation data may include, for example, compass data (e.g., latitude and/or longitude data), Geohash data, real-time network usage data associated with a specific location, sensor data obtained from one or more sensors associated with a specified location, and/or personal electronic device location data. Personal electronic device location data may include, for example, mobile- or computer-application-derived location data and/or purchased third party location data. The device-specific advertising identifiers may include, for example, mobile advertising IDs (such as an IDFA for iOS mobile phones or an AAID for Android mobile phones), browser cookies, account usernames, e-mail addresses or hashed e-mail address tokens, to name a few.

In exemplary embodiments, the measurement platform 60 may be configured to normalize the observation data by translating the observation data into a standardized format and validating the observation data by identifying and discounting invalid data. Observation data may be considered invalid if, for example, the data is provided in an invalid format, the data is provided after a published expiration window, the data is provided with insufficient fidelity as measured against one or more trusted sources, the data is provided with insufficient accuracy as measured against the one or more trusted sources, the data is provided from a lower-resolution data-source, the data is provided with irregularities in distribution and/or the data is duplicative with other observation information of the observation data. In exemplary embodiments, the measurement platform 60 may be configured to identify and discard restricted observation data, where such observation data is associated with observed personal electronic devices on which personal electronic device restrictions are enabled to limit or prevent distribution of device-specific advertising identifiers and/or location information.

FIG. 5A is a flow chart showing a process for utilizing ad tags to record impressions and related data associated with a static advertisement according to an exemplary embodiment of the present invention. In step S501 of the process, the measurement module 60 determines whether the static advertisement is associated with an ad tag. The ad tag may be, for example, an impression tracking tag from the digital ad buying system 50, a third-party impression tracking tag, measurement code from the digital ad buying system 50 or measurement code from a third party system. This step may involve the measurement module 60 referencing the creative identifier associated with the static advertising creative, and determining whether information associated with the referenced creative identifier includes an indication that the static advertisement is associated with an ad tag. If it is determined that the static advertisement is associated with an ad tag, the process continues to step S503, where the measurement module 60 may reference the ad tag received from the digital ad buying system 50 or third party system. Otherwise, the process ends at step S502. Continuing from step S503, in step S505, the measurement module 60 then configures the referenced ad tag so as to append relevant data associated with the impression. In step S506, the measurement module 60 may trigger the ad tag so as to transmit data related to the delivery of the static advertisement to the digital ad buying system 50 or the third party system so that such systems may record the impression and associated data and track the effectiveness of the static advertising.

FIG. 5B is a flow chart showing a process for utilizing click tracking tags to record click and related data associated with a static advertisement according to an exemplary embodiment of the present invention. In step S507, the measurement module 60 determines whether the static advertising creative has an associated click tracking tag. This step may involve the measurement module 60 referencing the creative identifier associated with the static advertising creative and determining whether information associated with the referenced creative identifier includes an indication that the static advertising creative is associated with a click tracking tag. In embodiments, the click tracking tag is provided to record events initiated on observed personal electronic devices associated with one or more consumers in direct response to a call-to-action embedded in the static advertising creative. A call-to-action may involve a request for a consumer to perform actions such as, for example, transmit a message (e.g., SMS message, MMS message, and/or messaging system message), visit a pre-defined webpage URL, scan a QR code and execute an associated embedded action associated with the QR code, send an e-mail to a pre-defined e-mail address, execute a command within an associated computer or mobile application, redeem a coupon, redeem a promotion code, place a call to a unique call-tracking telephone number, and/or post a social media message, the social media message including a unique hashtag, to name a few.

If the measurement module 60 determines that the static advertising creative 60 has an associated click tracking tag, the measurement module 60 may, in step S509, reference the click tracking tag received from the digital ad buying system 50 or an integrated measurement platform. Otherwise, the process ends at step S519. Continuing from step S509, in step S511, the measurement module 60 may identify an action performed on an observed personal electronic device in direct response to a call-to-action embedded in the static advertisement. Such identification may involve the measurement module 60 receiving an indication that a direct response to the call-to-action was performed, and retrieving an associated impression identifier, Deal ID or creative identifier by comparing a list of creative identifiers with attributes of the call-to-action. Such attributes may include, for example, a unique identifier, a URL or a keyword associated with the call-to-action. The measurement module 60 may then perform a virtual consumer action (step S513) corresponding to the direct response to the call-to-action as performed on the observed personal electronic device, and append the device-specific advertising identifier associated with the observed personal electronic device to the virtual consumer action along with the associated impression identifier, the Deal ID and/or the creative identifier (step S515). In step S517, the measurement module 60 may then trigger the click tracking tag with the virtual consumer action and appended information so that the digital ad buying system 50 and/or integrated measurement platform may record the click and associated data and track the effectiveness of the static advertising.

Figure 6:
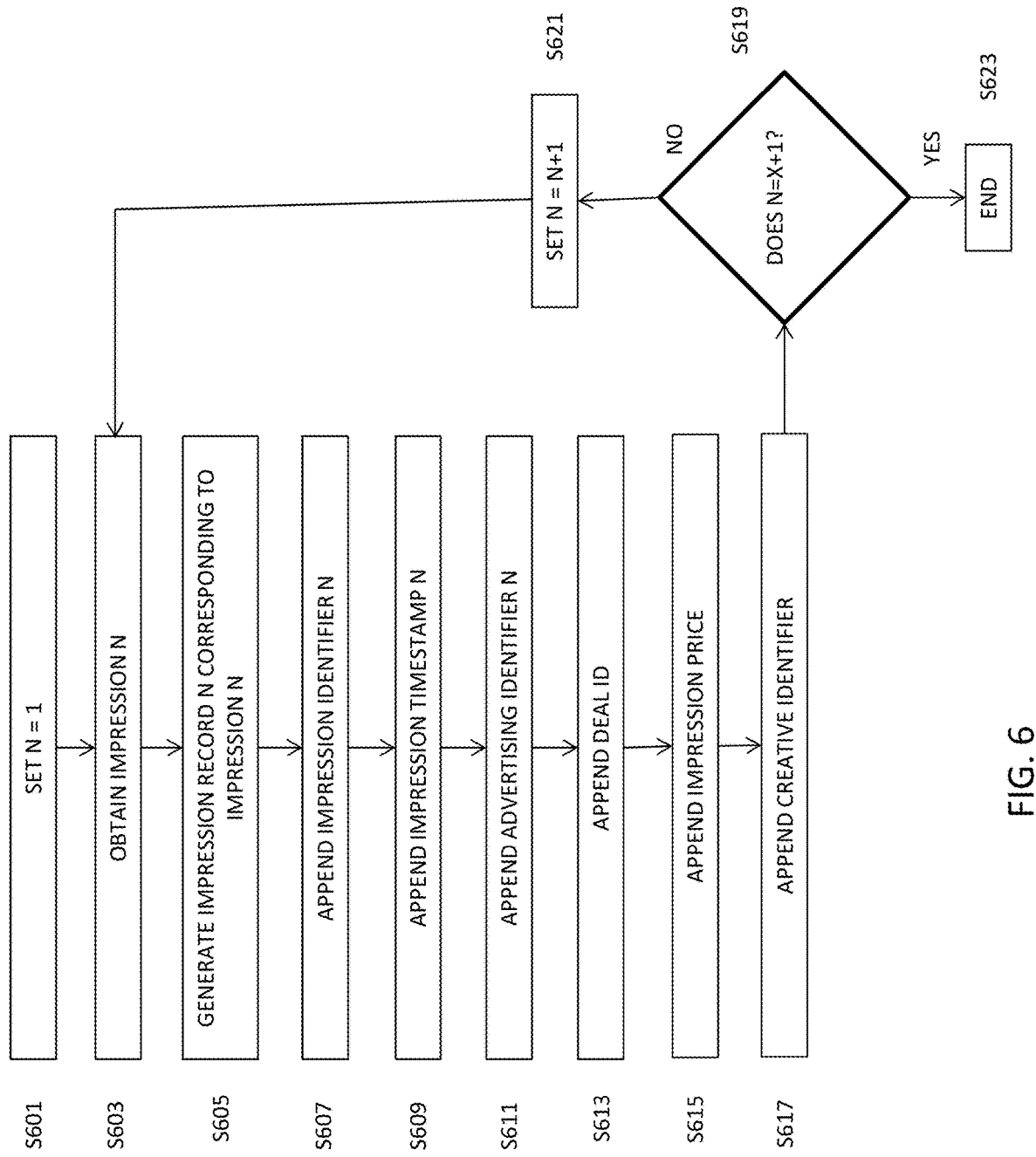
FIG. 6 is a flow chart showing a process for generating impression records in accordance with exemplary embodiments of the present invention.

FIG. 6 is a flow chart showing a process for generating impression records according to an exemplary embodiment of the present invention. In this regard, as explained previously, the measurement module 60 may be configured to generate X unique placeholder advertising identifiers corresponding to X estimated advertising impressions (which in turn, are associated with X impression records), where the number X may be calculated by the measurement platform 60 based on estimation data received and/or obtained by the asset module 35. The measurement module 60 may be configured to append specific information to each impression record to allow for attribution by the digital ad buying system 50 (and/or integrated measurement platform 110) and other functions to be performed with respect to advertising campaign (such as planning, retargeting, analytics, optimization, etc.). The process may begin at step S601, where a number N is set to 1. In step S603, the measurement module 60 may then reference estimated impression N from the X estimated impressions, and in step S605, generate an impression record N corresponding to the impression N. In step S607, the measurement module 60 may append an impression identifier N corresponding to the impression record N. Further information may be appended to the impression record N, including a corresponding impression timestamp N (step S609), a corresponding advertising identifier N (step S611), a corresponding Deal ID (step S613), a corresponding impression price (step S615), and a corresponding digital advertising creative identifier (step S617). In step S619, the measurement module 60 may determine whether N=X+1, and if the answer is "NO", the process may continue to step S621, where N is set to N+1 and the next estimated impression from the X estimated impressions may be referenced (step S603). If the answer is "YES" (indicating that all estimated impressions X have been accounted for), the process ends at step S623.

Figure 7:
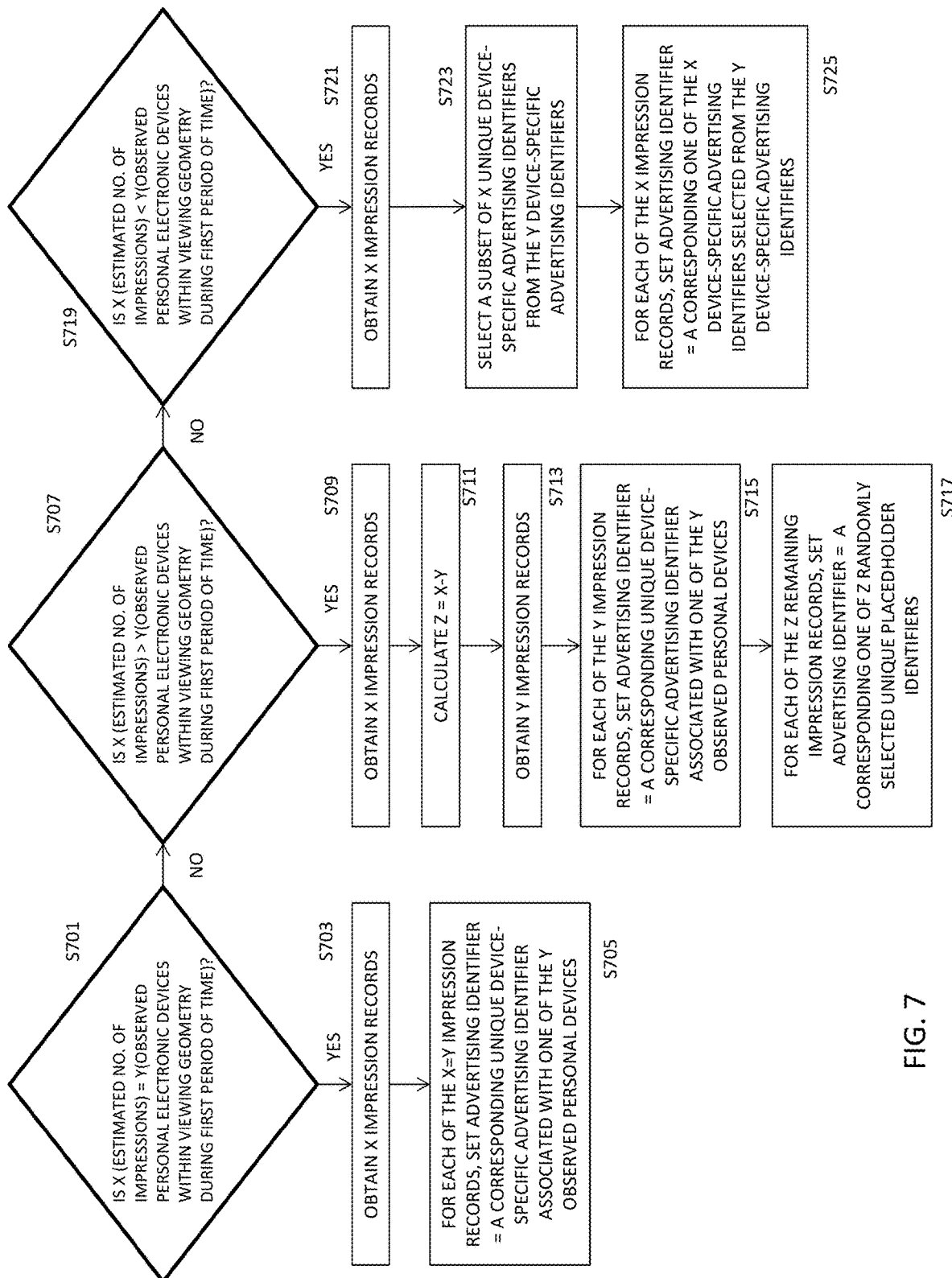
FIG. 7 is a flow chart showing a process for appending an advertising identifier to an impression record in accordance with exemplary embodiments of the present invention.

FIG. 7 is a flow chart showing a process for appending an advertising identifier to an impression record according to an exemplary embodiment of the present invention. In this regard, depending on the number X of estimated impressions and the number Y of observed personal electronic devices within a viewing geometry relative to the static display during a period of time in which the static advertisement is displayed, the advertising identifier for each impression record may be either a device-specific advertising identifier associated with a corresponding observed personal electronic device, or one of the unique placeholder advertising identifiers. In step S701 of the process, the measurement module 60 determines whether the number X (the number of estimated impressions) is equal to the number Y (the number of observed personal electronic devices within a viewing geometry during the relevant time period). If the answer is "YES", the measurement module 60 in step S703 may reference X impression records, and in step S705, for each of the X=Y impression records, set the corresponding advertising identifier equal to a corresponding unique device-specific advertising identifier associated with one of the Y observed personal electronic devices. In this exemplary embodiment, the impression timestamp for each impression record is set equal to the observation timestamp associated with the observation of the corresponding observed personal electronic device.

If the answer in step S701 is "NO", the measurement module 60 may determine in step S707 whether the number X is greater than the number Y. If so, the process continues to step S709, where X impression records are obtained, and then to step S711, where the measurement module 60 may calculate a number Z, which is equal to X−Y. The measurement module 60 in step S713 may then reference Y of the impression records, and in step S715, for each of the Y impressions records, set the advertising identifier equal to a corresponding unique device-specific advertising identifier associated with one of the Y observed personal electronic devices. In step S717, the measurement module 60 may, for each of the remaining Z impression records, set the advertising identifier equal to a corresponding one of Z randomly selected placeholder advertising identifiers. In this exemplary embodiment, the impression timestamp for each of the Y impression records is set equal to the observation timestamp associated with the observation of the corresponding observed personal electronic device, and the impression timestamp for each of the Z remaining impression records is set equal to a point in time during the time period during which the static advertisement is displayed. The point in time may be randomly selected or may be a first point in time during the time period, a last point in time during the time period or a midpoint time of the time period.

If the answer in step S707 is "NO", the measurement module 60 may determine in step S719 whether the number X is less than the number Y. If so, the process continues to step S721, where X impression records are obtained, and then to step S723, where the measurement module 60 may reference a subset of X unique device-specific advertising identifiers from the Y device-specific advertising identifiers, and in step S725, for each of the X impression records, set the advertising identifier equal to a corresponding one of the X device-specific advertising identifiers selected from the Y device-specific advertising identifiers. The subset X of the Y device-specific advertising identifiers may be selected randomly or based on a specified criteria. The specified criteria may be associated with, for example, frequency with which the device-specific advertising identifiers are observed over some time interval, predicted performance or response rates of the device-specific advertising identifiers, and/or audience characteristics matched to the device-specific advertising identifiers. In this exemplary embodiment, the impression timestamp for each impression record is set equal to the observation timestamp associated with the observation of the corresponding observed personal electronic device.

It should be appreciated that in exemplary embodiments there may be an instance in which there are no observed personal electronic devices associated with the static display during the relevant time period, in which case each advertising identifier associated with each impression record may be set to a corresponding placeholder advertising identifier.

Figure 8:
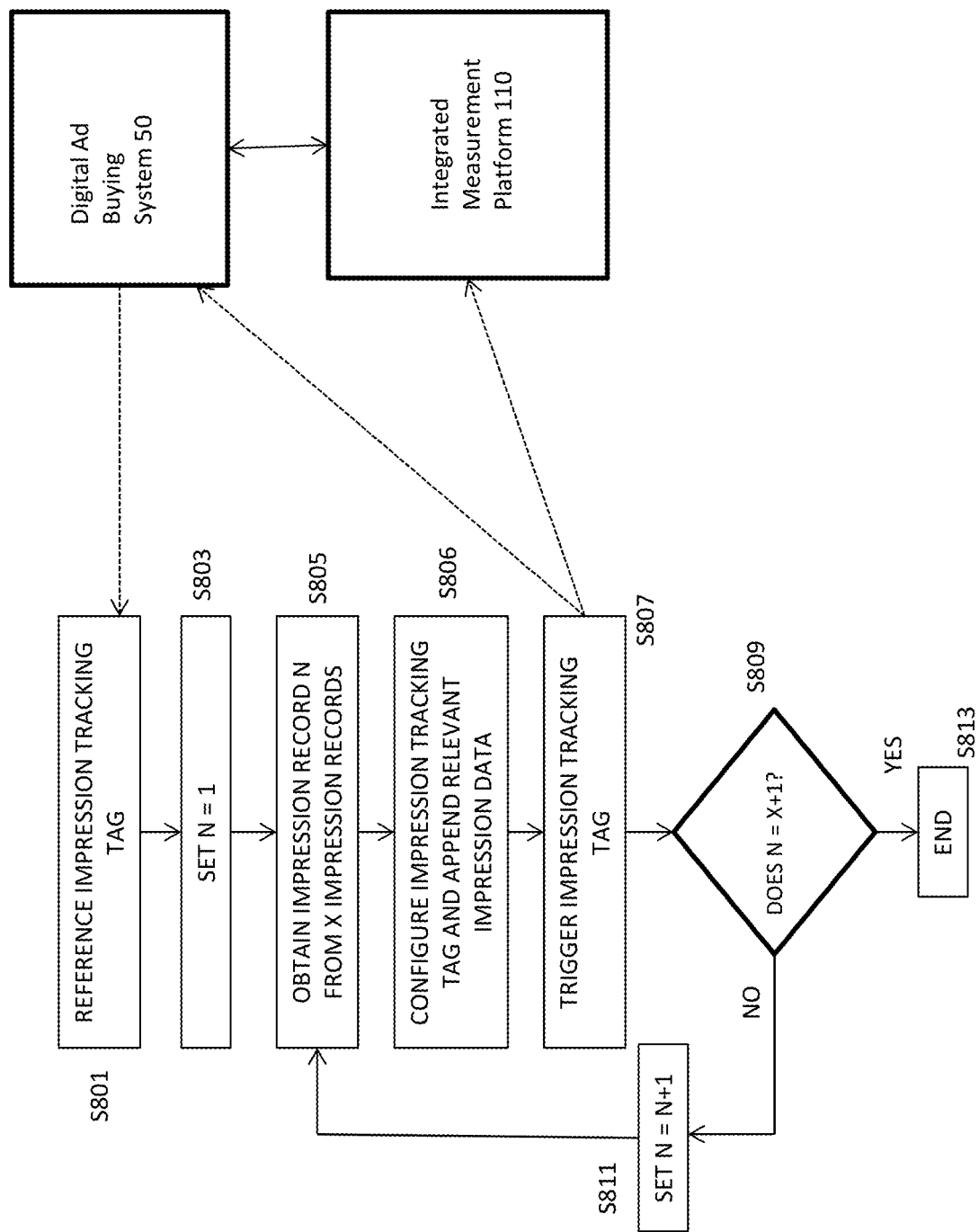
FIG. 8 is a flow chart showing a process for sending impression records and appended information to a digital ad buying system or an integrated measurement platform in accordance with exemplary embodiments of the present invention.

FIG. 8 is a flow chart showing a method for sending impression records and appended information to a digital ad buying system or an integrated measurement platform according to an exemplary embodiment of the present invention. In step S801 of the process, the measurement module 60 may reference an impression tracking tag received from the digital ad buying system 50. In exemplary embodiments, the impression tracking tag is associated with a static advertising campaign via a DealID, which is in turn associated with the static advertisement. In step S803, the measurement platform 60 may set a number N equal to 1, and then in step S805, reference an impression record N from the X impression records. In step S806, the measurement module 60 may configure the impression tracking tag so as to append relevant impression data for transmission to the digital ad buying system 50 and/or integrated measurement platform. In step S807, the measurement module 60 may then trigger the impression tracking tag referenced in step S801 and send the appended information associated with the impression record N to the digital ad buying system 50 or an integrated measurement platform. In step S809, the measurement platform 60 may determine whether the number N is equal to X+1 (indicating all impression records have been accounted for), and if not, the number N may be set to N+1 (step S811) and the next impression record may be referenced (step S803). Otherwise, the process ends at step S813. This process results in all of the X impression records being sent to the digital ad buying system 50 or integrated measurement platform via the impression tracking tag as triggered by the measurement platform 60.

Figure 9A:
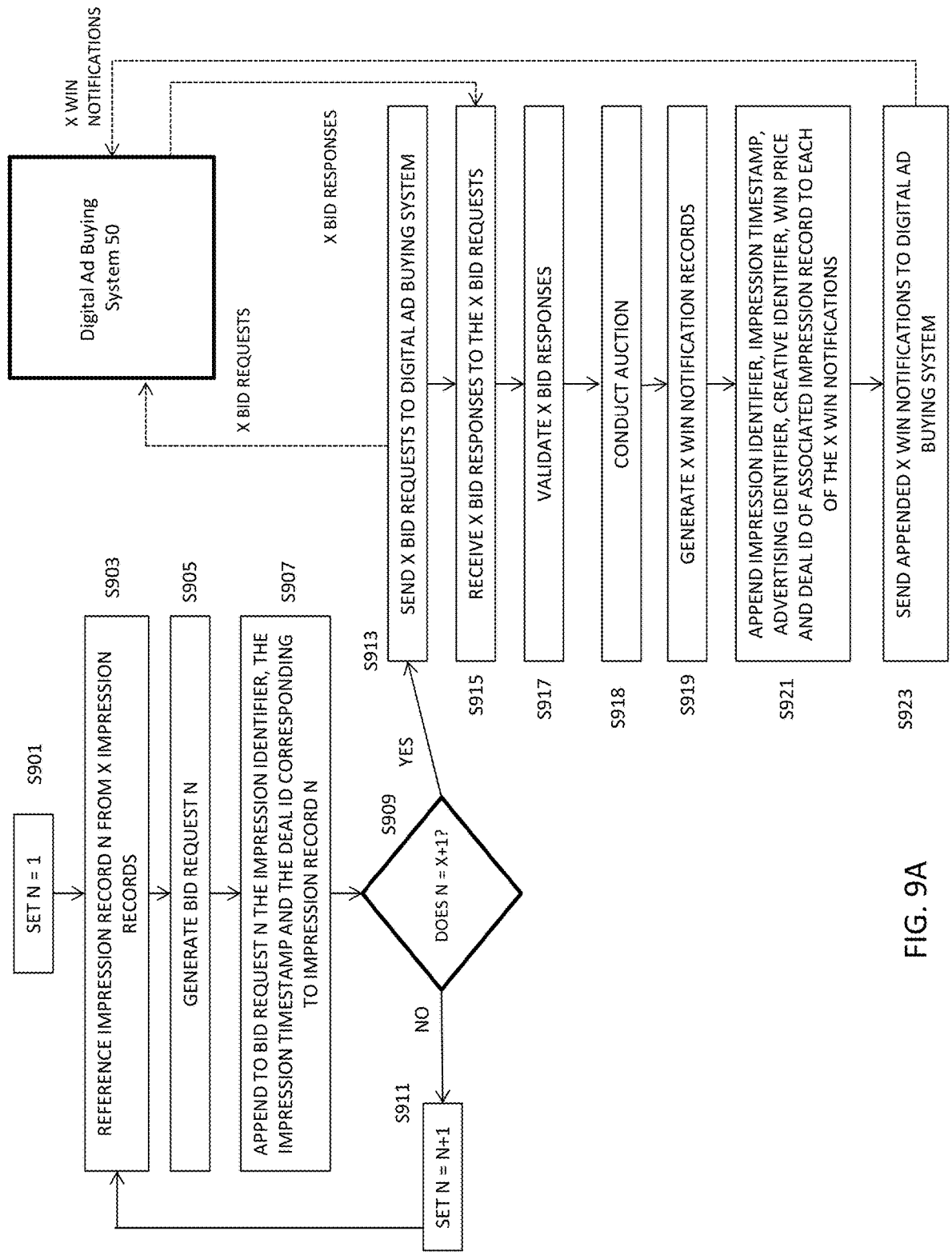
FIG. 9A is a flow chart showing a process for sending impression records and appended information to a digital ad buying system in accordance with exemplary embodiments of the present invention.

FIG. 9A is a flow chart showing a method for sending impression records and appended information to a digital ad buying system according to an exemplary embodiment of the present invention. In step S901 of the process, a number N may be set equal to 1, and in step S903, the measurement module 60 may reference an impression record N from the X impression records. In step S905, the measurement module 60 may generate a bid request N to be sent to the digital ad buying system using a real-time-bidding (RTB) protocol, and in step S907, append to the bid request N the impression identifier, the impression timestamp and the Deal ID corresponding to the impression record N, among other information. In step S909, the measurement module 60 may determine whether N is equal to X+1 (indicating all impression records have been accounted for), and if not, N may be set equal to N+1 (step S911) and the next impression record may be referenced (step S903). This process results in generation of a separate bid request to be sent to the digital ad buying system for each of the X impression records.

In step S913, after all bid requests have been generated, the measurement module 60 in step S913 may send the bid requests to the digital ad buying system 50. In step S915, the measurement module 60 may receive bid responses from the digital ad buying system 50 for each bid request. Each bid response may contain pricing information associated with the Deal ID corresponding to advertising campaign, at least one creative identifier for the static advertising creative corresponding to the advertising campaign and information necessary for registering one impression in the digital ad buying system 50. In exemplary embodiments, the information necessary for registering one impression in the digital ad buying system 50 may be specific to the digital ad buying system 50, and may include, for example, a transaction identifier, an encoded transaction record, a timestamp, and/or seller information, to name a few. In step S917, the measurement module 60 may validate the X bid responses, which may involve, for example, confirming that each bid response includes the required information in an acceptable format. In exemplary embodiments, an acceptable format is one that conforms to the applicable technical specifications and includes all required information, and confirming whether each bid response is in an acceptable format may involve confirming criteria, such as, for example, confirming a valid JSON format or confirming the presence of mandatory fields per applicable technical specifications, to name a few. In step S918, an auction is conducted to identify the X bid responses as X winning bid responses. In step S919, the measurement module may generate a win notification record for each of the X winning bid responses, and in step S921 append to each of the X win notification records the impression identifier, the impression timestamp, the advertising identifier, the creative identifier, the win price and Deal ID of the impression record associated with the winning bid response. The measurement module 60 in step S923 may then send the X win notification records with the appended information to the digital ad buying system 50.

In exemplary embodiments, the process of sending impression records and appended information to a digital ad buying system may occur in real-time, as each unique impression record with appended information becomes available, or at a regular interval. If at a regular interval, the interval may be, for example, one hour, a plurality of hours, one day, a plurality of days, one week, a plurality of weeks, or the duration of the advertising campaign.

Figure 9B:
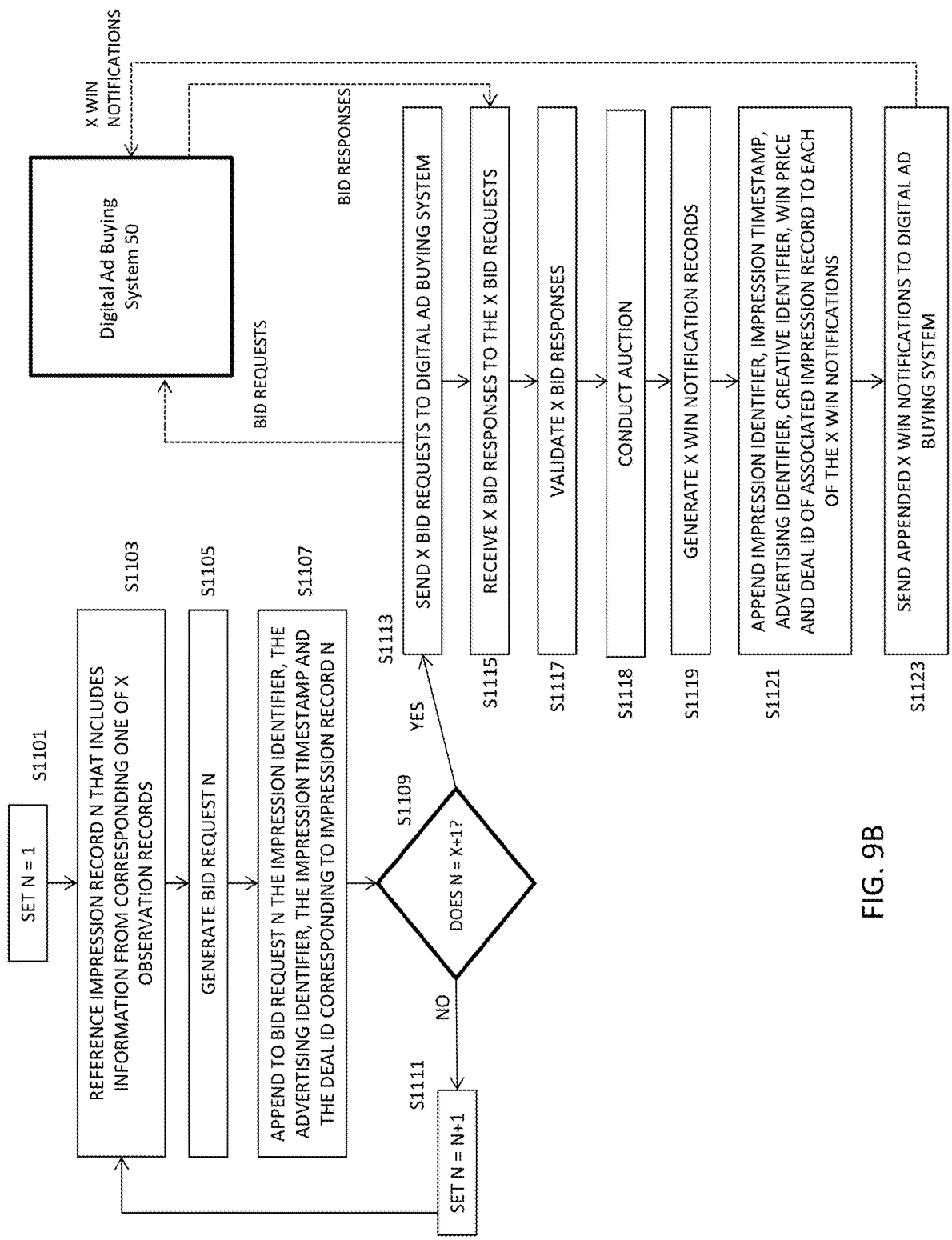
FIG. 9B is a flow chart showing a process for sending impression records and appended information to a digital ad buying system in accordance with exemplary embodiments of the present invention.

FIG. 9B is a flow chart showing a method for sending impression records and appended information to a digital ad buying system according to an exemplary embodiment of the present invention. In step S1101 of the process, a number N may be set equal to 1, and in step S1103, the measurement module 60 may reference an impression record N that includes information associated with a corresponding one of X observation records, including a corresponding advertising identifier. The corresponding advertising identifier may be determined in accordance with the process described with reference to FIG. 7, so that the advertising identifier may be a device-specific identifier or a placeholder identifier. In step S1105, the measurement module 60 may generate a bid request N to be sent to the digital ad buying system using a real-time-bidding (RTB) protocol, and in step S1107, append to the bid request N the impression identifier, the advertising identifier, the impression timestamp and the Deal ID corresponding to the impression record N. In step S1109, the measurement module 60 may determine whether N is equal to X+1 (indicating all impression records have been accounted for), and if not, N may be set equal to N+1 (step S1111) and the next impression record may be referenced (step S1103). This process results in generation of a separate bid request to be sent to the digital ad buying system for each of the X impression records.

In step S1113, after all bid requests have been generated, the measurement module 60 in step S1113 may send the bid requests to the digital ad buying system 50. In step S1115, the measurement module 60 may receive bid responses from the digital ad buying system 50 for each bid request. Each bid response may contain pricing information associated with the Deal ID corresponding to advertising campaign, at least one creative identifier for the static advertising creative corresponding to the advertising campaign and information necessary for registering one impression in the digital ad buying system 50. In exemplary embodiments, the information necessary for registering one impression in the digital ad buying system 50 may be specific to the digital ad buying system 50, and may include, for example, a transaction identifier, an encoded transaction record, a timestamp, and/or seller information, to name a few. In step S1117, the measurement module 60 may validate the X bid responses, which may involve, for example, confirming that each bid responses includes the required information in an acceptable format. In exemplary embodiments, an acceptable format is one that conforms to the applicable technical specifications and includes all required information, and confirming whether each bid response is in an acceptable format may involve confirming criteria, such as, for example, confirming a valid JSON format or confirming the presence of mandatory fields per applicable technical specifications, to name a few. In step S1118, an auction is conducted to identify the X bid responses as X winning bid responses. In step S1119, the measurement module may generate a win notification record for each of the X winning bid responses, and in step S1121 append to each of the X win notification records the impression identifier, the impression timestamp, the advertising identifier, the creative identifier, the win price and Deal ID of the impression record associated with the winning bid response. The measurement module 60 in step S1123 may then send the X win notification records with the appended information to the digital ad buying system 50.

Figure 9C:
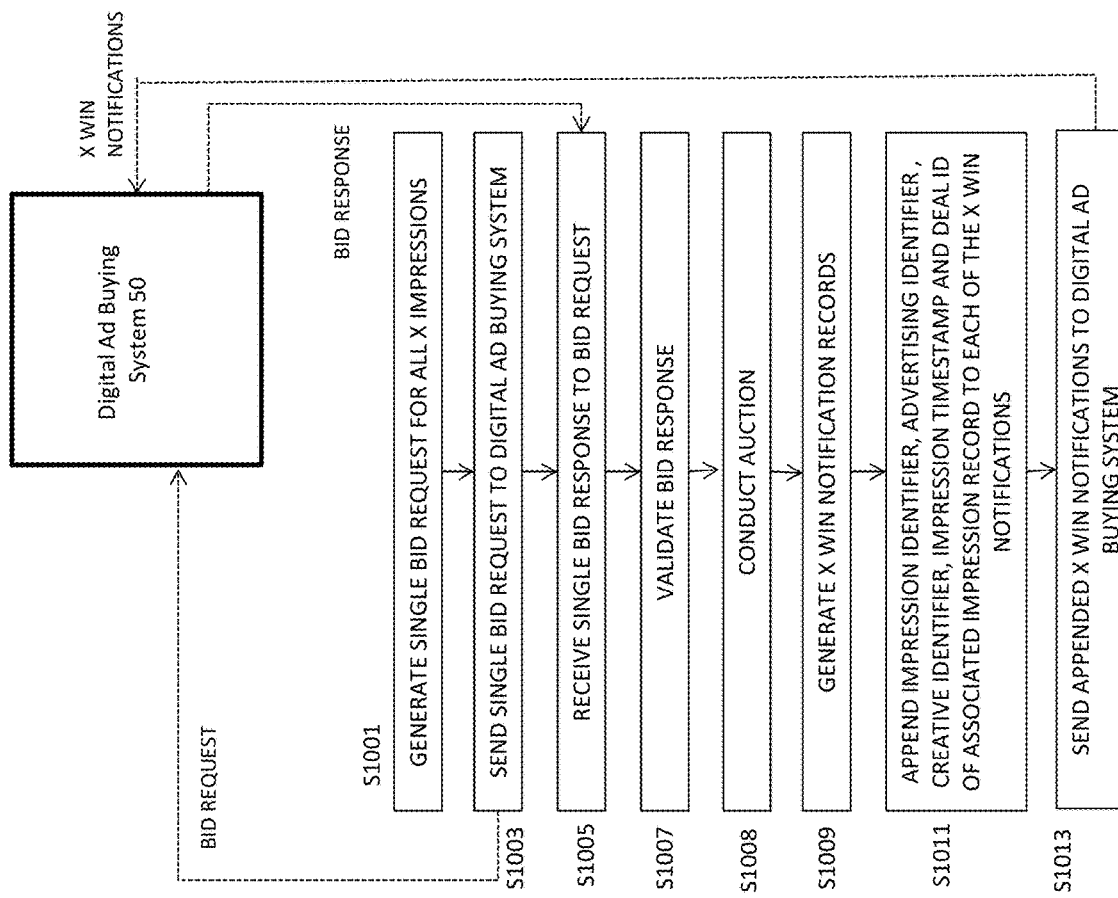
FIG. 9C is a flow chart showing a process for sending impression records and appended information to a digital ad buying system in accordance with exemplary embodiments of the present invention.

FIG. 9C is a flow chart showing a method for sending impression records and appended information to a digital ad buying system 50 according to an exemplary embodiment of the present invention. In step S1001, the measurement module 60 may generate a single bid request corresponding to all of the X advertising impression records during the period of time. The bid request may include the estimated number, X, of impressions, an identifier of the bid request, a timestamp for the bid request and the Deal ID associated with all of the X estimated impression records. In step S1003, after the bid request has been generated, the measurement module 60 may send the bid request to the digital ad buying system 50. In step S1005, the measurement module 60 may receive a single bid response from the digital ad buying system 50 for the bid request. The bid response may include X bids, where X is equal to the estimated number of impressions. Each of the X bids may include pricing information associated with the Deal ID corresponding to the advertising campaign, at least one creative identifier for the static advertising creative corresponding to the advertising campaign, and information necessary for registering an impression in the digital ad buying system 50. In exemplary embodiments, the information necessary for registering one impression in the digital ad buying system 50 may be specific to the digital ad buying system 50, and may include, for example, a transaction identifier, an encoded transaction record, a timestamp, and/or seller information, to name a few. In step S1007, the measurement module 60 may validate the bid response by, for example, confirming that the bid response includes the required information in an acceptable format. In exemplary embodiments, an acceptable format is one that conforms to the applicable technical specifications and includes all required information, and confirming whether each bid response is in an acceptable format may involve confirming criteria, such as, for example, confirming a valid JSON format or confirming the presence of mandatory fields per applicable technical specifications, to name a few. In step S1008, an auction is conducted to identify the X bids within the bid response as X winning bids. In step S1009, the measurement module 60 may generate a win notification record for each of the X winning bids in the bid response, and in step S1011 append to each of the win notification records the bid request identifier, an impression identifier, an advertising identifier, the advertising creative identifier, the impression timestamp and the Deal ID of the impression record associated with a corresponding one of the winning bids. The measurement module 60 in step S1013 may then send the X win notification records with the appended information to the digital ad buying system 50.

In exemplary embodiments, the measurement module 60 may track actual pacing for the advertising campaign based on, for example, spend delivered within the time interval for calculating monetary pacing and/or impressions delivered within the time interval for calculating impression pacing.

In embodiments, a "session" may be defined to demarcate distinct instances of the same consumer being exposed to a static advertisement multiple times in a given time period. In this regard, a fixed time or variable time period (e.g., 5 minutes, 10 minutes, 20 minutes) may be used to define and separate multiple sessions, movement of a consumer in space may be used to define and separate multiple sessions (e.g., where the consumer was exposed to the static advertisement in one location, left that location, and then returned to that location at a later time and was exposed again), detection of a consumer's gaze or attention using cameras and/or computer vision technology may be used to define and separate multiple sessions (e.g., where the consumer is observed to notice the ad, then look away, then notice the ad again). Session information may be used to aggregate or filter impressions transmitted to the ad buying system. For example, in exemplary embodiments, the measurement module 60 may determine whether multiple impressions within a given session correspond to the same advertising identifier, and if so, only one of those impressions may be used.

In accordance with exemplary embodiments of the present invention, call-to-action events may be tracked that are made in direct response to a unique quick response (QR) code in a static advertisement. The communications service 80 may provide the measurement module 60 with tracking information each time the QR code is scanned. Tracking information, in embodiments, identifies each time a call-to-action event is used (e.g., a QR code is scanned) by one or more personal electronic devices 21-1 . . . 21-n being operated by an individual 20-1 . . . 20-n. Tracking information may include information unique to the one or more personal electronic devices 21-1 . . . 21-n scanning the QR code.

After a QR code is scanned by one or more personal electronic devices 21-1 . . . 21-n, the QR code may be transformed by software of the one or more personal electronic devices 21-1 . . . 21-n into a web request. The web request may cause the generation of request information. Request information, in embodiments, identifies when a call-to-action event is performed (e.g., a scanned QR code) by one or more personal electronic devices 21-1 . . . 21-n. Collecting request information may help associate the event with a previously recorded individual impression (e.g., associated with an actual device-specific advertising identifier) using attributes included in the request information, for example: URL requested, requested IP address, cookies, user-agent, location of request, time of request, source network, and/or other meta data attached to the web request, to name a few. The measurement module 60 may then associate the web request with a previously recorded individual impression and emulate a browser making a click request to the digital ad buying system 50 and/or integrated measurement platform 110 by triggering the click tracker associated with the digital advertising creative and by including information from the previously recorded impression record as parameters or meta-data on the request. In embodiments, the measurement module 50 may associate the tracking information with a previously recorded impression record using data within the tracking information. The tracking information includes data that indicates a unique individual impression associated with a time and/or location. Using the tracking information may allow the measurement module 60 to associate the one or more personal electronic devices 21-1 . . . 21-*n* with a specific individual impression associated with a time and/or location.

In accordance with exemplary embodiments of the present invention, call-to-action events can be tracked by displaying, for example, a unique coupon code in the static advertisement and then having the communications service 80 provide the measurement module 60 with tracking information each time the code is submitted to a website, emailed for a transaction, postal mailed, provided on a phone call, entered into an e-commerce transaction, provided during a retail transaction, or other redemption, to name a few. The measurement module 60 will then associate the tracking information with a previously recorded impression record (e.g., associated with an actual device-specific advertising identifier), and then emulate a browser making a click request to the digital ad buying system 50 and/or integrated measurement platform 110 by triggering the click tracker associated with the static advertising creative and by including the previously recorded impression record information as parameters or meta-data on the request.

In accordance with exemplary embodiments of the present invention, call-to-action events can be tracked by, for example, displaying in the static advertisement a custom URL, which can track and redirect the personal electronic device to an advertiser URL. In such an embodiment, the process of redirecting from a human-readable short format (e.g., link.to/advertiser) can be used to determine the event was triggered, and collect request information to help associate the event with a previously recorded impression record. The measurement module 60 will then associate the request information with a previously recorded impression record (e.g., associated with an actual device-specific advertising identifier), and then emulate a browser making a click request to the digital ad buying system 50 and/or integrated measurement platform 110 by triggering the click tracker associated with the digital advertising creative and by including the previously recorded impression record information as parameters or meta-data on the request. Additional information such as, for example, webpage data, information about products or promotions, or other campaign specific information may also be collected.

In accordance with exemplary embodiments of the present invention, call-to-action events can be tracked by displaying a unique call-tracking telephone number in the static advertisement and then having a communications service 80 provide the measurement module 60 with tracking information each time a call is received at the call-tracking telephone number. The measurement module 60 will then associate the tracking information with a previously recorded impression record (e.g., associated with an actual device-specific advertising identifier), and then emulate a browser making a click request to the digital ad buying system 50 and/or integrated measurement platform 110 by triggering the click tracker associated with the digital advertising creative and by including the previously recorded impression record information as parameters or meta-data on the request. Additional information, such as, for example, referring number, call duration, automated menu selections, call quality score, or other campaign specific information, to name a few, may also be collected.

In accordance with exemplary embodiments of the present invention, call-to-action events can be tracked by displaying a unique SMS number or short code in the static advertisement and then having the communications service 80 provide the measurement module 60 with tracking information each time an SMS message is received using the number or short code associated with the static advertisement. The measurement module 60 will then associate the tracking information with a previously recorded impression record (e.g., associated with an actual device-specific advertising identifier), and then emulate a browser making a click request to the digital ad buying system 50 and/or integrated measurement platform 110 by triggering the click tracker associated with the digital advertising creative and by including the previously recorded impression record information as parameters or meta-data on the request. In embodiments, other forms of messaging such as MIMS, or messenger apps can be used in lieu of SMS message. Additional information, such as, for example, per-campaign keywords or other campaign specific information may also be collected.

In accordance with exemplary embodiments of the present invention, call-to-action events can be tracked by displaying a unique social media hashtag (e.g., #promoteadvertisercampaign) in the static advertisement and then having the communications service 80 provide the measurement module 60 with tracking information each time the hashtag is posted in social media. The measurement module 60 will then associate the tracking information with a previously recorded impression record (e.g., associated with an actual device-specific advertising identifier), and then emulate a browser making a click request to the digital ad buying system 50 and/or integrated measurement platform 110 by triggering the click tracker associated with the digital advertising creative and by including the previously recorded impression record information as parameters or meta-data on the request. Exemplary social media systems include Facebook®, Instagram®, Twitter®, Snapchat®, and/or LinkedIn®, to name a few. Additional information such as, for example, social media profile usernames, post engagement activity (e.g., likes, shares, etc.) or other campaign specific information may also be collected.

In accordance with exemplary embodiments of the present invention, call-to-action events can be tracked by displaying a unique email address in the static advertisement and then having the communications service 80 provide the measurement module 60 with tracking information each time such email address receives an email associated with the digital advertisement. The measurement module 60 will then associate the tracking information with a previously recorded impression record (e.g., associated with an actual device-specific advertising identifier), and then emulate a browser making a click request to the digital ad buying system 50 and/or integrated measurement platform 110 by triggering the click tracker associated with the digital advertising creative and by including the previously recorded impression record information as parameters or meta-data on the request. Additional information, such as, for example, email address, subject line, or other campaign specific information may also be collected.

In accordance with exemplary embodiments of the present invention, call-to-action events can be tracked using other information that can be used to link the event to a previously recorded individual impression (e.g., associated with an actual device-specific advertising identifier). Such other information may include, for example, date of the call-to-action, time of the call-to-action, a digital advertising campaign associated with the call-to-action and a keyword associated with the call-to-action, to name a few.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A system comprising:
one or more computers comprising:
one or more processors; and
one or more non-transitory computer readable memories operatively connected to the one or more processors and having stored thereon machine-readable instructions that, when executed by the one or more processors, cause the one or more processors to perform a method, the method comprising:
(A) storing, by the one or more computers, first data associated with the following information related to one or more static displays:
i. corresponding identifiers of the one or more static displays; and
ii. at least one attribute of each of the one or more static displays;
(B) receiving, by the one or more computers from a first seller of static advertising inventory, a first order for display of a static advertisement for a first period of time at a first static display of the one or more static displays, the first order comprising:
i. the identifier of the first static display of the one or more static displays on which the static advertisement is to be displayed;
ii. an identification of the first period of time during which the static advertisement will be displayed on the first static display;
iii. a buyer price that a buyer will pay for the first order;
iv. an indication of whether or not a call-to-action is embedded within the static advertisement; and
v. upon a condition a call-to-action is embedded within the static advertisement, attributes associated with the call-to-action;
(C) associating, by the one or more computers, the first order with a unique deal identifier instantiated in a digital ad buying system by the buyer and corresponding to an agreement between the buyer and the first seller for purchase of the first order;
(D) receiving, by the one or more computers from the digital ad buying system, at least one creative identifier for the static advertisement to be displayed;
(E) estimating, by the one or more computers, a number, X, of advertising impressions related to the static advertisement displayed on the first static display during the first period of time;
(F) generating, by the one or more computers, X unique placeholder advertising identifiers corresponding to the X estimated advertising impressions;
(G) collecting, by the one or more computers, observation data associated with one or more observed personal electronic devices, the observation data comprising for each of the one or more observed personal electronic devices:
i. a device-specific advertising identifier;
ii. location data associated with the observed personal electronic device; and
iii. an observation timestamp indicating a time an observation occurred;
(H) determining, by the one or more computers based on the observation data, a number, Y, of observed personal electronic devices located in a viewing geometry relative to the first static display from which users of the observed personal electronic devices had the opportunity to view the static advertisement during the first time period;
(I) creating, by the one or more computers, a corresponding impression record for each impression of the X estimated advertising impressions, the impression record for each impression comprising a unique impression identifier;
(J) for each impression record, appending, by the one or more computers, information comprising:
i. the unique impression identifier;
ii. an impression timestamp indicating the time the impression occurred;
iii. an advertising identifier including one of the following:
a. the device-specific advertising identifier associated with a corresponding one of the one or more observed personal electronic devices; or
b. one of the X unique placeholder advertising identifiers;
iv. the unique deal identifier;
v. an impression price of each impression; and
vi. the at least one creative identifier associated with the static advertising creative; and
(K) sending, by the one or more computers to the digital ad buying system or an integrated measurement platform, the following:
i. the X impression records corresponding to the X estimated advertising impressions; and
ii. the appended information to the X impression records, corresponding to the X estimated advertising impressions.

2. The system of claim 1, wherein the at least one attribute of the at least one static display comprises at least one of the following:
i. a seller name;
ii. a seller ID;
iii. a name of a seller network with which the at least one static display is associated, wherein the seller network is a grouping of one or more static advertising displays;
iv. an ID of a seller network with which the at least one static display is associated, wherein the seller network is a grouping of one or more static advertising displays;
v. a display name;
vi. a display ID;
vii. a precise location;
viii. physical dimensions;
ix. directional orientation;
x. lighting characteristics;
xi. movement characteristics;

xii. a projected number of viewers;
xiii. prohibited content;
xiv. zoning restrictions;
xv. lead-time required for posting;
xvi. transit route; or
xvii. transit schedule.

3. The system of claim 1, wherein the buyer price is specified by at least one of the following:
   i. a cost per thousand impressions (CPM);
   ii. a cost per thousand impressions delivered to a particular target audience, based on a set of predetermined audience characteristics;
   iii. a fixed total amount for a duration of an advertising campaign;
   iv. a rate of price per unit time;
   v. a cost per "click" (CPC) where a click is represented by executing the call-to-action associated with the static advertisement;
   vi. a cost per "action" (CPA) where an action is represented by a desired action (e.g. a purchase) taken by a consumer, following exposure to the static advertisement;
   vii. a "dynamic CPM" (DCPM) where the cost per thousand impressions is adjusted based on performance of the static advertisement; or
   viii. a cost per thousand impressions delivered in accordance with a set of target circumstances.

4. The system of claim 3, wherein:
the buyer price is specified by either a fixed total amount or a rate of price per unit time, and the method further comprises calculating, by the one or more computers, an equivalent CPM price based on the specified buyer price and the estimated impressions per unit time, and appending, by the one or more computers, the equivalent CPM price as the impression price for each impression record.

5. The system of claim 1, wherein the static advertisement is associated with an advertising campaign, and wherein the first order further comprises at least one of the following:
   i. a total monetary budget associated with the advertising campaign;
   ii. a total impression budget associated with the advertising campaign;
   iii. a time interval for calculating monetary pacing associated with an advertising campaign;
   iv. a target monetary pacing level associated with the advertising campaign;
   v. a time interval for calculating impression pacing associated with the advertising campaign; or
   vi. a target impression pacing level associated with the advertising campaign.

6. The system of claim 5, wherein the method further comprises determining, by the one or more computers, actual pacing for the advertising campaign based on at least one of the following:
   i. spend delivered within the time interval for calculating monetary pacing; or
   ii. impressions delivered within the time interval for calculating impression pacing.

7. The system of claim 1, wherein the first order further comprises an approval indication which indicates whether the first seller has approved the static advertising creative to be displayed.

8. The system of claim 1, where the unique deal identifier is associated with a guaranteed deal between the buyer and the first seller.

9. The system of claim 1, wherein the method further comprises receiving, by the one or more computers from the digital ad buying system, at least one ad tag.

10. The system of claim 9, wherein the at least one ad tag is configured to capture information related to a delivery of the static advertisement.

11. The system of claim 9, wherein the at least one ad tag comprises at least one of:
    i. an impression tracking tag from the ad buying system;
    ii. a third-party impression tracking tag;
    iii. measurement code from the ad buying system, configured for measurement of characteristics associated with delivery of the static advertisement; or
    iv. measurement code from a third party system, configured for measurement of characteristics associated with delivery of the static advertisement.

12. The system of claim 10, wherein the method further comprises triggering, by the one or more computers, the at least one ad tag so as to transmit data related to the delivery of the static advertisement to the ad buying system or a third-party system.

13. The system of claim 1, wherein the method further comprises receiving, by the one or more computers from the digital ad buying system, at least one click tracking tag.

14. The system of claim 13, wherein the at least one click tracking tag is configured to record events initiated on the one or more observed personal electronic devices associated with at least one consumer in direct response to an embedded call-to-action embedded in the static advertising creative.

15. The system of claim 14, wherein the method further comprises:
   (L) dynamically identifying, by the one or more computers, at least one action performed on at least one of the one or more observed electronic devices in direct response to a call to action associated with the static advertising creative displayed on the first static display, wherein said dynamically identifying the at least one action comprises:
      i. receiving, by the one or more computers from the at least one observed personal electronic device, a first indication that a direct response to the call-to-action was performed;
      ii. retrieving, by the one or more computers, at least one of:
         1. an associated impression identifier;
         2. the Unique deal identifier; or
         3. the at least one creative identifier by comparing the creative identifier with attributes of the call-to-action response;
      iii. performing, by the one or more computers, a virtual consumer action corresponding to the direct response to the call-to-action as performed on the at least one observed personal electronic device;
      iv. appending, by the one or more computers to the virtual consumer action, the device-specific advertising identifier associated with the at least one observed personal electronic device, and at least one of:
         1. the associated impression identifier;
         2. the unique deal identifier; or
         3. the at least one creative identifier; and
      v. triggering, by the one or more computers, the at least one click tracking tag with the appended information of step (L)(iv) to register the virtual consumer action in the digital ad buying system or an integrated measurement platform.

16. The system of claim 1, wherein the call-to-action comprises at least one of:
   i. transmitting a message, the message comprising at least one of an SMS message, MMS message, or messaging system message;
   ii. visiting a pre-defined webpage URL;
   iii. scanning of a QR code and execution of an associated embedded action associated with the QR code;
   iv. sending an e-mail to a pre-defined e-mail address;
   v. executing a command within an associated computer or mobile application;
   vi. redeeming a coupon;
   vii. redeeming a promotion code;
   viii. placing a call to a unique call-tracking telephone number; or
   ix. posting a social media message, the social media message including a unique hashtag.

17. The system of claim 1, wherein attributes of the call-to-action comprise at least one of:
   i. a unique identifier;
   ii. a URL; or
   iii. a keyword associated with the call-to-action.

18. The system of claim 1, wherein X is determined based on at least one of the following:
   i. rating agency data obtained from rating agencies;
   ii. network connection data obtained from network connections;
   iii. sensor data collected from one or more sensors;
   iv. the observation data; or
   v. mobile application data obtained from one or more mobile applications.

19. The system of claim 1, wherein the one or more computers perform step (E) in real-time.

20. The system of claim 1, wherein the one or more computers perform step (E) as advertising impression information becomes available.

21. The system of claim 1, wherein the one or more computers perform step (E) at a regular interval.

22. The system of claim 21, wherein the regular interval is at least one of the following:
   i. an hour
   ii. a plurality of hours;
   iii. a day;
   iv. a plurality of days;
   v. a week;
   vi. a plurality of weeks; or
   vii. an entire duration of an advertising campaign.

23. The system of claim 1, wherein, at step (E), the one or more computers estimate a number, X, of advertising impressions by calculating the number, X, based on a combination of data from a plurality of estimation data sources.

24. The system of claim 1, wherein, at step (E), the one or more computers adjust the estimated number, X, of advertising impressions related to the static advertisement based on at least one of the following:
   i. a time of a day;
   ii. a day of a week;
   iii. a seasonality data skew;
   iv. an observational data skew;
   v. real-time network activity; or
   vi. real-time sensor data.

25. The system of claim 1, wherein the observation data is collected from a plurality of observation data sources via an application programming interface.

26. The system of claim 1, wherein the one or more computers perform step (G) in real-time.

27. The system of claim 1, wherein the one or more computers perform step (G) as observation data information becomes available.

28. The system of claim 1, wherein the one or more computers perform step (G) at a regular interval.

29. The system of claim 28, wherein the regular interval is at least one of the following:
   i. an hour
   ii. a plurality of hours;
   iii. a day;
   iv. a plurality of days;
   v. a week;
   vi. a plurality of weeks; or
   vii. an entire duration of an advertising campaign.

30. The system of claim 1, wherein the location data comprises at least one of the following:
   i. compass data including latitude data and longitude data;
   ii. Geohash data;
   iii. real-time network usage data associated with a specified location;
   iv. sensor data obtained from one or more sensors associated with a specified location;
   v. personal electronic device location data comprising at least one of the following:
      a. mobile- or computer-application-derived location data; or
      b. purchased third-party location data.

31. The system of claim 1, wherein the method further comprises, at step (G), normalizing, by the one or more computers, the observation data, wherein the normalizing comprises the steps of:
   i. translating the observation data into a standardized format; and
   ii. validating the observation data by identifying and discounting invalid data, the invalid data being identified by determining the observation data is at least one of the following:
      a. provided in an invalid format;
      b. provided after a published expiration window;
      c. provided with insufficient fidelity as measured against one or more trusted sources;
      d. provided with insufficient accuracy as measured against the one or more trusted sources;
      e. provided from a lower-resolution data-source;
      f. provided with irregularities in distribution; or
      g. duplicative with other observation information of the observation data.

32. The system of claim 1, wherein the method further comprises:
   (L) identifying, by the one or more computers, restricted observation data of the collected observation data associated with at least one of the one or more observed personal electronic devices on which personal electronic device restrictions are enabled to limit or prevent distribution of at least one of:
      i. device-specific advertising identifiers; or
      ii. location information; and
   (M) discarding, by the one or more computers, the restricted observation data.

33. The system of claim 1, wherein the method further comprises, at step (J), comparing, by the one or more computers, the X estimated advertising impressions during the first time period to the number, Y, of observed personal electronic devices located within the viewing geometry of the first static display during the first time period.

34. The system of claim 33, wherein the step of comparing further comprises:

i. determining, by the one or more computers, that X is greater than Y;
ii. calculating, by the one or more computers, a third number, Z, wherein Z is equal to X minus Y;
iii. obtaining, by the one or more computers, Y impression records of the X impression records;
iv. appending, by the one or more computers, a unique corresponding one of the device-specific advertising identifiers associated with the Y observed personal electronic devices to each of the Y impression records; and
v. appending, by the one or more computers, a unique corresponding one of Z randomly selected unique placeholder advertising identifiers of the X unique placeholder advertising identifiers to each remaining impression record of the X impression records.

35. The system of claim 33, wherein the step of comparing further comprises:
i. determining, by the one or more computers, that X is equal to Y;
ii. obtaining, by the one or more computers, the X impression records; and
iii. appending, by the one or more computers, a unique corresponding one of the device-specific advertising identifiers associated with the Y observed personal electronic devices to each of the X impression records.

36. The system of claim 33, wherein the step of comparing further comprises:
i. determining, by the one or more computers, that X is less than Y;
ii. selecting, by the one or more computers, a subset of the Y device-specific advertising identifiers corresponding to the Y observed personal electronic devices, the subset containing X of the Y device-specific advertising identifiers; and
iii. appending, by the one or more computers, a unique corresponding one of the selected sub-set of X device-specific advertising identifiers to each of the X impression records.

37. The system of claim 36, wherein selecting the subset X of the Y device-specific advertising identifiers corresponding to the Y observed personal electronic devices, is performed either:
a. randomly; or
b. based on a specified criteria.

38. The system of claim 37, wherein the specified criteria is based on at least one of the following:
1. a frequency with which the device-specific advertising identifiers are observed over a time interval;
2. predicted performance or response rates of the device-specific advertising identifiers; or
3. audience characteristics matched to the device-specific advertising identifiers.

39. The system of claim 1, wherein the method further comprises, at step (K):
iii. prior to step (K)(i), obtaining, by the one or more computers from the digital ad buying system, an impression tracking tag associated with a static advertising campaign associated with the static advertisement;
iv. configuring, by the one or more computers, the impression tracking tag so as to append relevant data associated with each impression; and
v. triggering, by the one or more computers, the impression tracking tag once for each of the X impression records, to register X impressions, including the appended information for each impression, in the digital ad buying system or an integrated measurement platform.

40. The system of claim 1, wherein the method further comprises, at step (K):
iii. generating, by the one or more computers, one bid request for each of the X impression records, using a real-time bidding (RTB) protocol;
iv. appending, by the one or more computers, to each of the bid requests, the impression identifier, the impression timestamp and the unique deal identifier corresponding to the impression record associated with the bid request;
v. sending, by the one or more computers, each of the bid requests corresponding to the X impression records, to the digital ad buying system;
vi. receiving, by the one or more computers from the digital ad buying system, X bid responses to the X bid requests, each of the bid responses containing:
1. pricing information associated with the corresponding unique deal identifier;
2. at least one creative identifier for the static advertising creative to be displayed; and
3. information necessary for registering one impression in the digital ad buying system;
vii. validating, by the one or more computers, the X bid responses based on a set of criteria;
viii. conducting, by the one or more computers, an auction to identify the X bid responses as X winning bid responses;
ix. generating, by the one or more computers, a win notification record for each of the X winning bid responses;
x. appending, by the one or more computers, the information from the associated impression record including the advertising identifier and the pricing information to each of the win notifications; and
xi. sending, by the one or more computers, the appended win notification for each winning bid response, to the digital ad buying system.

41. The system of claim 1, wherein the method further comprises, at step (K):
iii. generating, by the one or more computers, one bid request for each of the X impression records, using a real-time bidding (RTB) protocol;
iv. appending, by the one or more computers, to each of the bid requests, the impression identifier, an advertising identifier, the impression timestamp and the unique deal identifier corresponding to the impression record associated with the bid request;
v. sending, by the one or more computers, each of the bid requests corresponding to the X impression records to the digital ad buying system;
vi. receiving, by the one or more computers from the digital ad buying system, X bid responses to the bid requests, each of the bid responses containing:
1. pricing information associated with the corresponding unique deal identifier;
2. at least one creative identifier for the static advertising creative to be displayed; and
3. information required for registering one impression in the digital ad buying system;
vii. validating, by the one or more computers, the X bid responses based on a set of criteria;
viii. conducting, by the one or more computers, an auction to identify the X bid responses as X winning bid responses;

ix. generating, by the one or more computers, a win notification record for each of the X winning bid responses;
x. appending, by the one or more computers, the information from the associated impression record and the pricing information to each of the win notifications; and
xi. sending, by the one or more computers, the appended win notification for each winning bid response to the digital ad buying system.

42. The system of 1, wherein the method further comprises, at step (K):
   iii. generating, by the one or more computers, one bid request corresponding to all of the X advertising impressions during the first period of time, using a real-time bidding (RTB) protocol, the one bid request comprising:
      a. the estimated number of impressions, X;
      b. an identifier for the bid request;
      c. a timestamp for the bid request; and
      d. the unique deal identifier;
   iv. sending, by the one or more computers, the single bid request to the digital ad buying system;
   v. receiving, by the one or more computers from the digital ad buying system, one bid response to the bid request, wherein the bid response includes X bids, where X is equal to the estimated number of impressions, each of the X bids comprising:
      1. pricing information associated with the unique deal identifier;
      2. at least one creative identifier for the static advertising creative to be displayed; and
      3. information required for registering up to X impressions in the digital ad buying system;
   vi. validating, by the one or more computers, the bid response received for the bid request, based on a set of criteria;
   vii. conducting, by the one or more computers, an auction to identify the X bids as X winning bids;
   viii. generating, by the one or more computers, a win notification record for each of the X winning bids in the bid response;
   ix. appending, by the one or more computers to each of the X win notifications, information from a corresponding one of the X impression records; and
   x. sending, by the one or more computers, the win notifications and appended information to the digital ad buying system.

43. The system of claim 1, wherein the one or more computers perform step (K) in real-time.

44. The system of claim 1, wherein the one or more computers perform step (K) as each unique impression record with appended data becomes available.

45. The system of claim 1, wherein the one or more computers perform step (K) at a regular interval.

46. The system of claim 45, wherein the regular interval is at least one of the following:
   i. an hour
   ii. a plurality of hours;
   iii. a day;
   iv. a plurality of days;
   v. a week;
   vi. a plurality of weeks;
   vii. a duration of the campaign.

47. The system of claim 1, wherein the identification of the first period of time during which the static advertisement will be displayed on the first static display comprises:
   i. a start date;
   ii. a start time;
   iii. an end date; and
   iv. an end time.

48. The system of claim 1, wherein the method further comprises, at step (K), determining, by the one or more computers, whether to send the unique impression record for each impression to the digital ad buying system based on a set of filtering criteria.

49. The system of claim 48, wherein the set of filtering criteria comprises at least one of the following:
   verifying that a current date is after both a start date and start time and the current date is before both an end date and an end time;
   verifying that the unique deal identifier is valid;
   verifying that the at least one creative identifier is valid;
   verifying that the display ID is valid;
   verifying that there are no applicable restrictions pertaining to displaying the static advertisement creative on the first static display;
   verifying that the first seller has approved the static advertising creative;
   verifying that the buyer price is above a floor set by the first seller;
   verifying that a total spend delivered at a point in time does not exceed an overall monetary budget set by the first seller;
   verifying that total impressions delivered at a point in time does not exceed an overall impression budget set by the first seller;
   verifying that the actual campaign pacing has not exceeded either:
      a. the desired monetary pacing level for the campaign; or
      b. the desired impression pacing level for the campaign; or
   verifying that multiple impressions within a given session do not correspond to the same advertising identifier, where a session is a second period of time within the first period of time.

50. The system of claim 1, wherein the identification of the first static display of the one or more static displays comprises at least one of the following:
   i. a unique display identifier; or
   ii. a precise location of the specific static display.

51. The system of claim 1, wherein the device-specific advertising identifier comprises at least one of:
   1. mobile advertising IDs;
   2. browser cookies;
   3. account usernames;
   4. e-mail addresses; or
   5. hashed e-mail address tokens.

52. The system of claim 1, wherein, in step (J):
   upon the condition that the advertising identifier information in the impression record includes the device-specific advertising identifier associated with a corresponding one of the one or more observed personal electronic devices, the impression timestamp indicates the time the impression occurred is the same as the observation timestamp associated with the observation of the corresponding one of the one or more observed personal electronic devices, and
   upon the condition that the advertising identifier in the impression record includes one of the X unique placeholder advertising identifiers, the impression timestamp is a point in time during the first time period.

53. The system of claim 52, wherein the point in time is randomly selected, a first point in time during the first time period, a last point in time during the first time period, or a midpoint time of the first time period.

* * * * *